United States Patent
Hanawa et al.

(10) Patent No.: US 12,475,386 B2
(45) Date of Patent: Nov. 18, 2025

(54) LEARNING DEVICE, INFORMATION PROCESSING APPARATUS, SUBSTRATE PROCESSING DEVICE, SUBSTRATE PROCESSING SYSTEM, LEARNING METHOD, RECIPE DETERMINATION METHOD AND NON-TRANSITORY COMPUTER-READABLE MEDIUM STORING LEARNING PROGRAM

(71) Applicant: SCREEN HOLDINGS CO., LTD., Kyoto (JP)

(72) Inventors: Yosuke Hanawa, Kyoto (JP); Yuta Sasaki, Kyoto (JP); Shogo Kunieda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 630 days.

(21) Appl. No.: 17/878,242

(22) Filed: Aug. 1, 2022

(65) Prior Publication Data

US 2023/0090836 A1    Mar. 23, 2023

(30) Foreign Application Priority Data

Sep. 22, 2021    (JP) .................................. 2021-154403

(51) Int. Cl.
   *G06N 5/022*    (2023.01)
   *H01L 21/67*    (2006.01)

(52) U.S. Cl.
   CPC ....... *G06N 5/022* (2013.01); *H01L 21/67028* (2013.01)

(58) Field of Classification Search
   CPC .......................... G06N 5/022; H01L 21/67028
   USPC ........................................................... 706/12
   See application file for complete search history.

(56) References Cited

U.S. PATENT DOCUMENTS

| | | | |
|---|---|---|---|
| 7,542,134 B2 | 6/2009 | Owczarz et al. | |
| 9,805,943 B2 * | 10/2017 | Kikuchi | G03F 7/094 |
| 2006/0139450 A1 | 6/2006 | Oweczarz et al. | |
| 2008/0138247 A1 | 6/2008 | Inganas et al. | |
| 2010/0248152 A1 | 9/2010 | Scheer et al. | |
| 2013/0008868 A1 | 1/2013 | Uozumi et al. | |
| 2016/0071747 A1 | 3/2016 | Uozumi et al. | |
| 2019/0163158 A1 | 5/2019 | Takahara | |

(Continued)

FOREIGN PATENT DOCUMENTS

| | | |
|---|---|---|
| JP | 5021486 B2 | 9/2012 |
| JP | 2012-243869 A | 12/2012 |

(Continued)

OTHER PUBLICATIONS

Choi, et al., "Machine learning-based virtual metrology on film thickness in amorphous carbon layer deposition process", Measurement: Sensors 16 (2021) 100046, 2021 (Year: 2021).*

(Continued)

*Primary Examiner* — Tsu-Chang Lee
(74) *Attorney, Agent, or Firm* — Rimon P.C.

(57) ABSTRACT

A learning device includes a hardware processor, wherein the hardware processor acquires a film thickness of a solid or a liquid formed on the substrate by driving a substrate processing device under a first condition, and causes a learning model to learn first training data including the film-thickness characteristic acquired by driving of the substrate processing device under the first condition.

15 Claims, 15 Drawing Sheets

(56) References Cited

U.S. PATENT DOCUMENTS

| | | |
|---|---|---|
| 2019/0214277 A1 | 7/2019 | Uozumi et al. |
| 2021/0048794 A1 | 2/2021 | Moki et al. |
| 2021/0183051 A1 | 6/2021 | Nakago et al. |
| 2021/0202258 A1 | 7/2021 | Naohara et al. |
| 2021/0209413 A1 | 7/2021 | Nakago et al. |
| 2021/0262781 A1 | 8/2021 | Tadokoro et al. |
| 2022/0121176 A1 | 4/2022 | Moki et al. |
| 2022/0181171 A1 | 6/2022 | Uozumi et al. |
| 2024/0211753 A1 | 6/2024 | Nakago et al. |
| 2025/0259849 A1 | 8/2025 | Naohara et al. |

FOREIGN PATENT DOCUMENTS

| | | |
|---|---|---|
| JP | 2013-016699 A | 1/2013 |
| JP | 2013-258272 A | 12/2013 |
| JP | 2015-142069 A | 8/2015 |
| JP | 2019-093479 A | 6/2019 |
| JP | 2020-004817 A | 1/2020 |
| JP | 2020-178266 A | 10/2020 |
| JP | 2021-132183 A | 9/2021 |
| KR | 10-2021-0038665 A | 4/2021 |
| KR | 10-2021-0084305 A | 7/2021 |
| KR | 10-2021-0092238 A | 7/2021 |
| TW | 201109846 A | 3/2011 |
| TW | 202125618 A | 7/2021 |
| WO | 2019/155928 A1 | 8/2019 |
| WO | 2020/049974 A1 | 3/2020 |
| WO | 2020/105517 A1 | 5/2020 |

OTHER PUBLICATIONS

Wei, et al., "Machine learning optimization for p-Type transparent conducting films", Chemistry of Materials, 31, 7340-7350, 2019 (Year: 2019).*

Mishra, et al., "Brain inspired computing approach for the optimization of the thin film thickness of polystyrene on the glass substrates", arXiv.2107.12156, Jul. 21, 2021: https://arxiv.org/abs/2107.12156 (Year: 2021).*

* cited by examiner

LEARNING DEVICE, INFORMATION PROCESSING APPARATUS, SUBSTRATE PROCESSING DEVICE, SUBSTRATE PROCESSING SYSTEM, LEARNING METHOD, RECIPE DETERMINATION METHOD AND NON-TRANSITORY COMPUTER-READABLE MEDIUM STORING LEARNING PROGRAM

CROSS REFERENCE TO RELATED APPLICATIONS

This application claims the benefits of Japanese Application No. 2021-154403, filed on Sep. 22, 2021, the entire contents of which are hereby incorporated by reference.

BACKGROUND

Technical Field

The present invention relates to a learning device that causes a learning model to learn, an information processing apparatus that causes a learned learning model to infer, a substrate processing device including the information processing apparatus, a substrate processing system including the information processing apparatus and the substrate processing device, a learning method of causing a learning model to learn, a recipe determination method of causing a learned learning model to infer and a non-transitory computer readable medium storing a learning program that causes a computer to perform the learning method.

Description of Related Art

In recent years, the pattern strength tends to be weak due to finer patterns formed on a substrate. Therefore, a pattern may collapse due to surface tension exerted between the surface of a pattern formed on a substrate and a liquid before the liquid applied to the substrate is dried. In regard to this problem, there is a technique so-called sublimation drying in which the liquid applied to the surface on which a pattern is formed on the substrate is converted into a solid and dried by a phase change from the solid to a gas.

In a process to which this sublimation drying technique is applied, it is desirable that a solid film thickness before sublimation (hereinafter referred to as "a solidified film thickness") is uniform over an entire substrate. In a case in which the solidified film thickness is not uniform, and there are thin portions and thick portions, a pattern formed on a substrate may collapse. Therefore, it is desirable to optimize parameters that affect the solidified film thickness in order to make the solidified film thickness be uniform. However, there are many types of parameters that affect the liquid film thickness or the solid film thickness in the sublimation drying process, and it is difficult to determine optimum values.

Although it is conceivable to use a simulator that simulates the solidified film thickness in order to obtain appropriate parameters, an extraordinary amount of time is required for simulation. Therefore, parameters cannot be determined in real time in a manufacturing process.

WO 2020/049974 A1 describes a learning device that acquires parameters of a simulator with respect to image data, inputs the image data and the parameters to a learning model and causes the learning model to learn such that output of the learning model is close to a result of simulation with respect to the image data.

Patent Document

[Patent Document 1] JP 2013-116699 A
[Patent Document 2] JP 2012-243869 A
[Patent Document 3] JP 2013-258272 A
[Patent Document 4] JP 2015-142069 A
[Patent Document 5] WO 2020/049974 A1

SUMMARY

However, in the learning device described in WO 2020/049974 A1, the same number of image data pieces to be input to the simulator as the number of training data pieces provided to the learning model needs to be prepared, and it takes an extraordinary amount of time until a significant number of training data pieces is acquired for modeling.

An object of the present invention is to provide a learning device, a learning method and a non-transitory computer-readable medium storing a learning program that enable generation of a learning model for inferring a film-thickness characteristic indicating a characteristic of film thickness of a solid or a liquid formed on a substrate in a process of removing a solid film or a liquid film formed on the substrate from the substrate to dry the substrate.

Another object of the present invention is to provide a learning device and a learning method that enables generation of a learning model.

Further, yet another object of the present invention is to provide an information processing apparatus and a recipe determination method that can easily obtain a recipe for driving a substrate processing device using a learning model.

According to one aspect of the present invention, a learning device includes a hardware processor, wherein the hardware processor acquires a film thickness of a solid or a liquid formed on a substrate by driving a substrate processing device that removes a solid film or a liquid film from a substrate to dry the substrate after supplying a liquid to the substrate and executing a series of processes of forming a solid film or a liquid film on the substrate under a first condition, and causes a learning model to learn first training data including a film-thickness characteristic, which indicates a characteristic of the film thickness of a solid or a liquid acquired by driving of the substrate processing device under a first condition.

According to another aspect of the present invention, an information processing apparatus includes a hardware processor, wherein the hardware processor determines a recipe using a learning model that infers a film-thickness characteristic indicating a characteristic of a film thickness of a solid or a liquid formed on a substrate at a point in time at which a series of processes executed by a substrate processing device is completed based on a driving condition under which the substrate processing device is driven, the substrate processing device removing a solid film or a liquid film from the substrate to dry the substrate after supplying a liquid to the substrate and executing the series of processes of forming a solid film or a liquid film on the substrate, the driving condition has a value set for each of a plurality of items, and the hardware processor determines the recipe based on a temporary condition in a case in which a film-thickness characteristic inferred by the learning model satisfies an allowable condition when the temporary condition having a prescribed value set for part of the plurality of items and any values set for other items is provided to the learning model as the driving condition.

According to yet another aspect of the present invention, an information processing apparatus includes a hardware processor, wherein the hardware processor acquires an intermediate processing state at a point in time before completion of a series of processes executed by a substrate processing device that removes a solid film or a liquid film from a substrate to dry the substrate after supplying a liquid to the substrate and executes the series of processes of forming a solid film or a liquid film on the substrate, and determines a recipe using a learning model that infers a film-thickness characteristic indicating a characteristic of a film thickness of a solid or a liquid formed on the substrate at a point in time at which the series of processes executed by the substrate processing device is completed based on a driving condition under which the substrate processing device is driven and an intermediate processing state at a point in time before the completion of the series of processes executed by the substrate processing device driven under the driving condition, the driving condition has a value set for each of a plurality of items, and the hardware processor provides the acquired intermediate processing state and a temporary condition having a prescribed value set for part of the plurality of items and any values set for other items as the driving condition to the learning model, and determines a new recipe based on the temporary condition in a case in which a film-thickness characteristic inferred by the learning model satisfies an allowable condition.

According to yet another aspect of the present invention, an information processing apparatus includes a hardware processor, wherein the hardware processor determines a recipe using a first learning model that infers a film-thickness characteristic indicating a characteristic of a film thickness of a solid or a liquid formed on a substrate at a point in time at which a series of processes executed by a substrate processing device is completed based on a driving condition under which the substrate processing device is driven, the substrate processing device removing a solid film or a liquid film from the substrate to dry the substrate after supplying a liquid to the substrate and executing the series of processes of forming a solid film or a liquid film on the substrate, acquires an intermediate processing state at a point in time before completion of the series of processes executed in accordance with the recipe by the substrate processing device, and supplies the acquired intermediate processing state to a second learning model, which infers a film-thickness characteristic indicating a characteristic of a film thickness of a solid or a liquid formed on the substrate at a point in time at which the series of processes executed by the substrate processing device is completed based on the driving condition and an intermediate processing state at a point in time before completion of the series of processes executed by the substrate processing device in accordance with the recipe, and determines a new recipe.

According to yet another aspect of the present invention, a learning method includes an experimental data acquiring step of acquiring a film thickness of a solid or a liquid formed on the substrate by driving a substrate processing device that removes a solid film or a liquid film from a substrate to dry the substrate after supplying a liquid to the substrate and executing a series of processes of forming a solid film or a liquid film on the substrate under a first condition, and a learning step of causing a learning model to learn first training data including the film-thickness characteristic indicating a characteristic of a film thickness acquired in the experimental data acquiring step and the first condition.

According to yet another aspect of the present invention, a recipe determination method includes a recipe determination step of determining a recipe using a learning model that infers a film-thickness characteristic indicating a characteristic of a film thickness of a solid or a liquid formed on a substrate at a point in time at which a series of processes executed by the substrate processing device is completed based on a driving condition under which the substrate processing device is driven, the substrate processing device removing a solid film or a liquid film from the substrate to dry the substrate after supplying a liquid to the substrate and executing the series of processes of forming a solid film or a liquid film on the substrate, wherein the driving condition has a value set for each of a plurality of items, and the recipe determination step includes determining the recipe based on a temporary condition in a case in which a film-thickness characteristic inferred by the learning model satisfies an allowable condition when the temporary condition having a prescribed value set for part of the plurality of items and any values set for other items is provided to the learning model as the driving condition.

According to yet another aspect of the present invention, a recipe determination method includes an intermediate processing state acquiring step of acquiring an intermediate processing state at a point in time before completion of a series of processes executed by an substrate processing device that removes a solid film or a liquid film from a substrate to dry the substrate after supplying a liquid to the substrate and executes the series of processes of forming a solid film or a liquid film on the substrate; and a correction step of determining a recipe using a learning model that infers a film-thickness characteristic indicating a characteristic of a film thickness of a solid or a liquid formed on the substrate at a point in time at which the series of processes executed by the substrate processing device is completed based on a driving condition under which the substrate processing device is driven and an intermediate processing state at a point in time before the completion of the series of processes executed by the substrate processing device driven under the driving condition, wherein the driving condition has a value set for each of a plurality of items, and a correction step includes providing the intermediate processing state acquired in the intermediate processing state acquiring step and a temporary condition having a prescribed value set for part of the plurality of items and any values set for other items as the driving condition to the learning model, and determining a new recipe based on the temporary condition in a case in which a film-thickness characteristic inferred by the learning model satisfies an allowable condition.

According to yet another aspect of the present invention, a non-transitory computer readable medium storing a learning program, wherein the learning program causes a computer to acquire a film thickness of a solid or a liquid formed on the substrate by driving a substrate processing device that removes a solid film or a liquid film from a substrate to dry the substrate after supplying a liquid to the substrate and executing a series of processes of forming a solid film or a liquid film on the substrate under a first condition, and cause a learning model to learn first training data including the film-thickness characteristic acquired by driving of the substrate processing device under the first condition.

Other features, elements, characteristics, and advantages of the present disclosure will become more apparent from the following description of preferred embodiments of the present disclosure with reference to the attached drawings.

DETAILED DESCRIPTION

First Embodiment (1) Processing System

Figure 1:
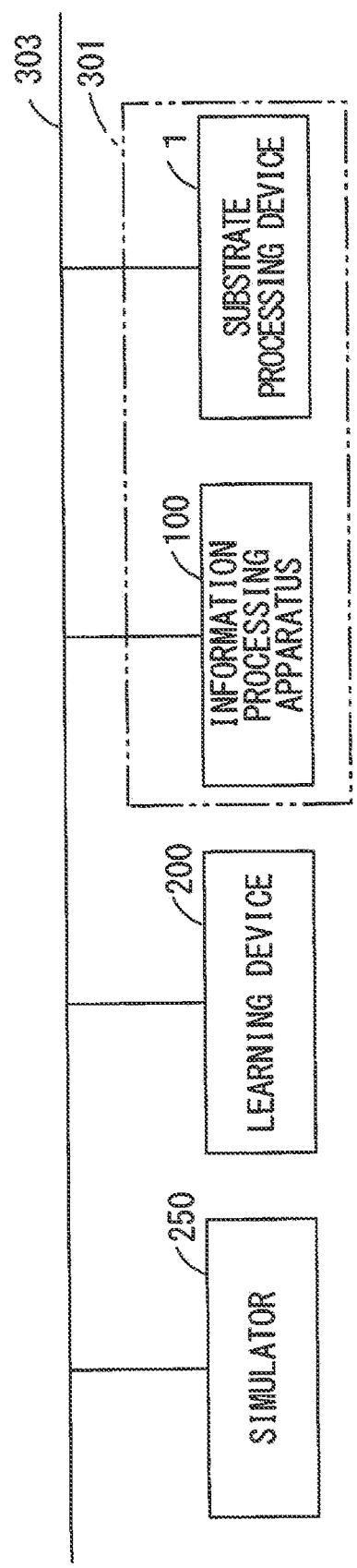
FIG. 1 is a diagram showing one example of the configuration of a processing system according to a first embodiment of the present invention.

A processing system according to embodiments of the present invention will be described below with reference to the drawings. FIG. 1 is a diagram showing one example of the configuration of a processing system according to a first embodiment of the present invention. As shown in FIG. 1, the processing system 300 includes a substrate processing system 301, a learning device 200 and a simulator 250. The substrate processing system 301 includes an information processing apparatus 100 and a substrate processing device 1.

The learning device 200, the simulator 250 and the information processing apparatus 100 are general computers. Therefore, they can be basically constituted by the same hardware. Here, the information processing apparatus will be described as an example. Different programs are installed in the learning device 200, the simulator 250 and the information processing apparatus 100. Therefore, the learning device 200, the simulator 250 and the information processing apparatus 100 execute processes different from one another.

The substrate processing device 1 processes a substrate. A substrate refers to a semiconductor substrate (a semiconductor wafer), a substrate for an FPD (Flat Panel Display) such as a liquid crystal display device or an organic EL (Electro Luminescence) display device, a substrate for an optical disc, a substrate for a magnetic disc, a substrate for a magneto-optical disc, a substrate for a photomask, a ceramic substrate, a substrate for a solar cell, or the like.

The information processing apparatus 100, the substrate processing device 1, the learning device 200 and the simulator 250 are respectively connected to a network 303 and can transmit and receive data to and from one another. As the network 303, a Local Area Network (LAN) or a Wide Area Network (WAN) is used, for example. Further, the network 303 may be the Internet. Further, the information processing apparatus 100 and the substrate processing device 1 may be connected via a dedicated network instead of the network 303. The network 303 may be connected through a wired connection or a wireless connection.

The learning device 200 and the simulator 250 do not necessarily have to be connected to the network 303. In this case, training data generated in the simulator 250 may be transferred to the learning device 200 via a recording medium. Further, a learning model generated in the learning device 200 may be transferred to the information processing apparatus 100 via a recording medium.

The substrate processing device 1 removes a solid film or a liquid film from a substrate to dry the substrate after executing a series of processes of supplying a liquid to a substrate and forming the solid film or the liquid film on the substrate. Specifically, the substrate processing device 1 executes the series of processes including applying a pre-drying processing liquid, which is a mixed liquid that is obtained when a sublimable substance is dissolved in a solvent and has a predetermined concentration, to the surface of the substrate on which a pattern is formed, and then precipitating the sublimable substance on the substrate by causing the solvent to evaporate while rotating the substrate. Thereafter, the substrate processing devices 1 sprays an inert gas to the substrate to perform sublimation drying of the substrate.

Figure 2:
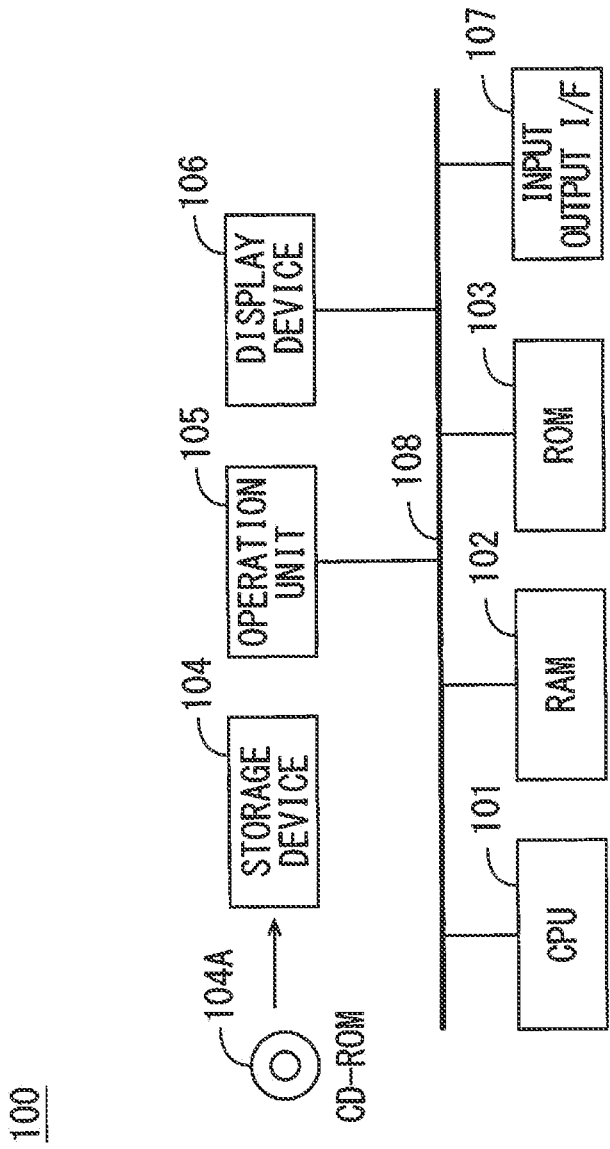
FIG. 2 is a diagram showing one example of the configuration of an information processing apparatus.

FIG. 2 is a diagram showing one example of the configuration of an information processing apparatus. With reference to FIG. 2, the information processing apparatus 100 includes a CPU (Central Processing Unit) 101, a RAM (Random Access Memory) 102, a ROM (Read Only Memory) 103, a storage device 104, an operation unit 105, a display device 106 and an input/output interface (I/F) 107. The CPU 101, the RAM 102, the ROM 103, the storage device 104, the operation unit 105, the display device 106 and the input/output I/F 107 are connected to a bus 108.

The RAM 102 is used as a work area for the CPU 101. A system program is stored in the ROM 103. The storage device 104 includes a storage medium such as a hard disc or a semiconductor memory and stores a program. The program may be stored in the ROM 103, a CD-ROM 114A or another external storage device.

The operation unit 105 is an input device such as a keyboard, a mouse or a touch panel. A user can provide a predetermined instruction to the information processing apparatus 100 by operating the operation unit 105. The display device 106 is a display device such as a liquid crystal display device and displays a GUI (Graphical User Interface) or the like for receiving an instruction from the user. The input/output I/F 107 is connected to the network 303.

(2) Functional Configuration of Processing System

Figure 3:
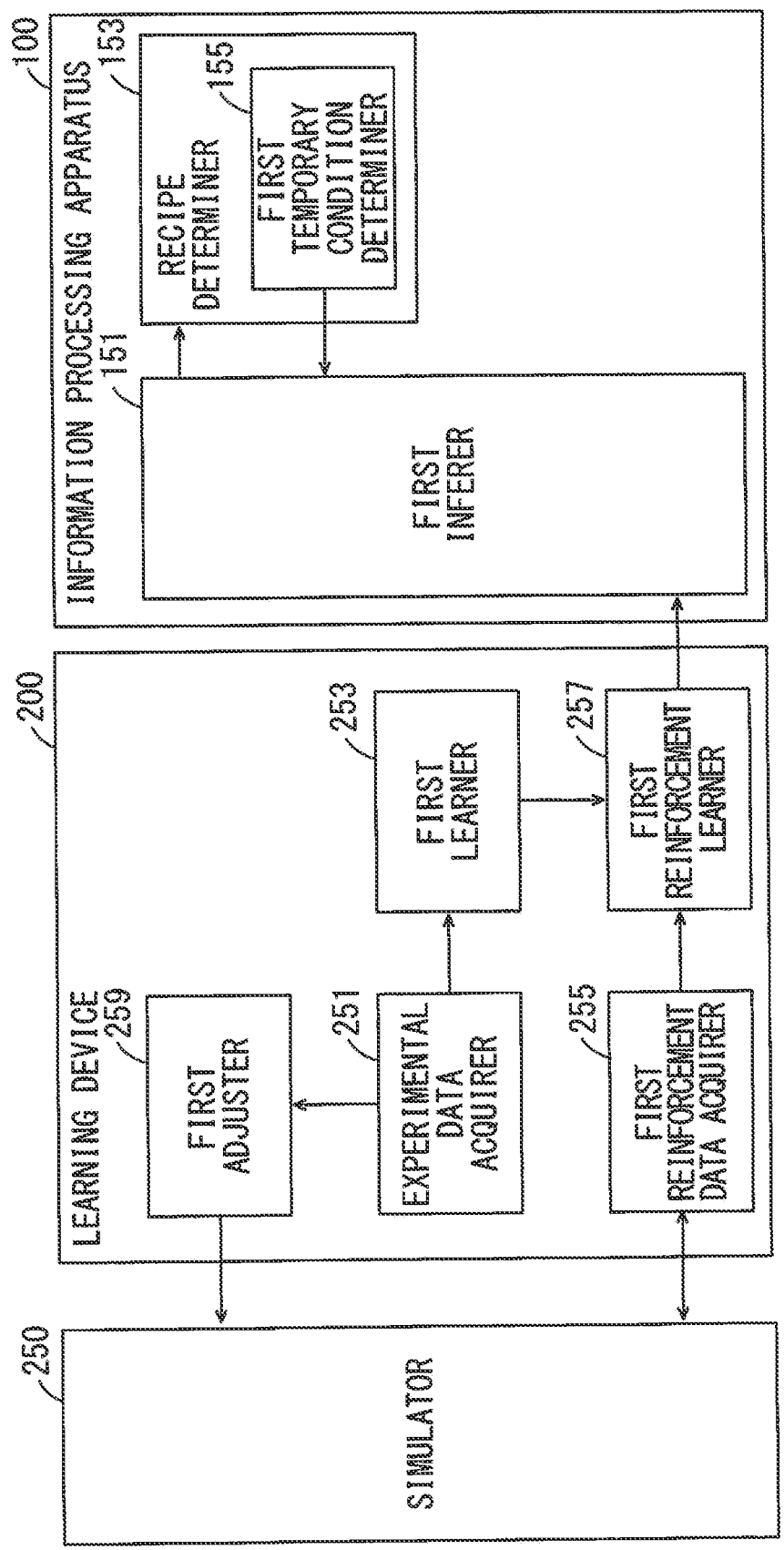
FIG. 3 is a diagram showing one example of the functional configuration of the processing system in the first embodiment.

FIG. 3 is a diagram showing one example of the functional configuration of the processing system in the first embodiment. With reference to FIG. 3, the simulator 250 is realized by execution of a simulate program by a CPU included in the simulator 250. In the substrate processing device 1, the simulator 250 simulates movement of a liquid mixture obtained when a sublimable substance is dissolved in solvent on a substrate. The simulator 250 is configured based on a physical model. Therefore, the simulator 250 is a physical model that reproduces the movement of the liquid mixture during execution of the series of processes executed by the substrate processing device 1. The physical model is realized with use of a flow analysis program for analyzing a flow of a liquid mixture on a substrate, for example.

The functions of the learning device 200 are implemented by execution of a learning program by a CPU included in the learning device 200. The learning device 200 includes an experimental data acquirer 251, a first learner 253, a first reinforcement data acquirer 255, a first reinforcement learner 257 and a first adjuster 259.

The experimental data acquirer 251 acquires experimental data and outputs the acquired experimental data to the first learner 253 and the first adjuster 259. The experimental data is obtained when the substrate processing device 1 executes the series of processes and measures the film thickness of a liquid film or a solid film formed on a substrate. The experimental data includes a first condition and a film thickness which is a result of experiment. The first condition is a driving condition for driving the substrate processing device 1. The driving condition includes a recipe that is set to cause the substrate processing device 1 to execute the series of processes and a state condition indicating a state at a point in time at which the substrate processing device 1 starts the series of processes. The recipe is the information defining a value that is set for controlling the substrate processing device 1 and the information defining a setting value corresponding to each of various setting items. The state condition includes the information that affects the movement of a liquid mixture applied to a substrate and is not defined in the recipe. Specifically, the state condition includes an environmental condition indicating the environment in which a substrate to be processed is arranged and the characteristic information of a liquid mixture. The environmental condition includes the temperature and pressure of a processing chamber in which a substrate is arranged, for example. The characteristic information of a liquid mixture includes the information indicating the characteristic of a liquid mixture obtained when a sublimable substance is dissolved in a solvent.

Figure 4:
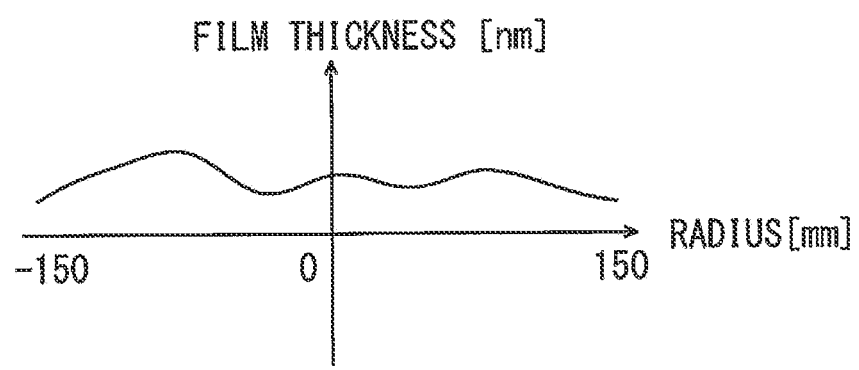
FIG. 4 is a diagram showing one example of a film thickness obtained in an experiment.

FIG. 4 is a diagram showing one example of a film thickness obtained in an experiment. With reference to FIG. 4, the abscissa indicates a position in a radial direction of a substrate, and the ordinates indicates a film thickness. The origin of the abscissa indicates the center of a substrate. Execution of the series of processes by the substrate processing device 1 does not necessarily mean that the film thickness of a liquid film or a solid film is uniform on an entire substrate. A film-thickness characteristic is a value indicating the characteristic in regard to the film thickness of a liquid film or a solid film on an entire substrate.

Returning to FIG. 3, the first learner 253 generates first training data based on experimental data and causes a first learning model to learn the first training data. The first training data includes a first condition and a film-thickness characteristic. The film-thickness characteristic is the information representing the characteristic in regard to the film thickness of a liquid film or a solid film on a substrate. The film-thickness characteristic includes a value indicating that the film thickness of a liquid film or a solid film formed on a substrate is included in an allowable range, and a value indicating that the film thickness of a liquid film or a solid film formed on a substrate is not included in the allowable range.

For example, in a case in which the maximum value and the minimum value of the film thickness of a liquid film or a solid film formed on a substrate are included in a predetermined allowable range, the film-thickness characteristic is taken as a value indicating that the film-thickness characteristic is included in the allowable range. Further, in a case in which a film-thickness range is not included in the allowable range, the film-thickness characteristic is taken as a value indicating that the film-thickness characteristic is not included in the allowable range. The allowable range has a defined maximum value and a defined minimum value.

A value indicating that the film thickness of a liquid film or a solid film formed on a substrate is included in the allowable range may have a plurality of levels. For example, a value may be classified into the levels based on the ratio of a film-thickness range (the difference between a maximum value and a minimum value) to the allowable range. In a case in which the ratio of a film-thickness range to the allowable range is equal to or smaller than 50%, a rank A is assigned to the film-thickness characteristic. In a case in which the ratio exceeds 50%, a rank B is assigned to the film-thickness characteristic.

The first training data is preferably classified into a plurality of channels according to the state of a surface of a substrate, the shape of a pattern formed on a substrate and the physical properties of a liquid mixture applied to a substrate. It is possible to improve accuracy of inference by a first learning model by generating the first learning model in regard to each of the plurality of channels.

The first adjuster 259 adjusts the simulator 250 based on experimental data. The experimental data includes a first condition for execution of the series of processes by the substrate processing device 1 and a film thickness. The first adjuster 259 adjusts the simulator 250 such that a result of execution of movement of a liquid mixture on a substrate during execution of the series of processes by the substrate processing device 1 under the first condition included in the experimental data by the simulator 250 is close to a film thickness included in the experimental data.

The first reinforcement data acquirer 255 acquires a film-thickness characteristic indicating the characteristic in regard to the solid film thickness or the solid film thickness that is obtained when the simulator 250 is driven under a second condition. The second condition has the same condition item as that of the first condition included in the experimental data and has a different value. The first reinforcement data acquirer 255 generates the second condition in accordance with a predetermined rule. The second condition may be randomly generated. The first reinforcement data acquirer 255 determines a film-thickness characteristic by comparing the film thickness of a liquid film or a solid film output by the simulator 250 with a predetermined allowable range. The first reinforcement data acquirer 255 outputs second training data including the second condition and the film-thickness characteristic to the first reinforcement learner 257 as first reinforcement data.

The first reinforcement learner 257 causes the learned first learning model, which the first learner 253 has caused to learn, to learn the second training data which is the first reinforcement data. Because the learned first learning model, which the first learner 253 has caused to learn, further learns the second training data, it is not necessary to prepare the number of first training data pieces required for the first learning model to learn, by experiment, the first learning model can be generated easily. In other words, the second training data generated by the simulator 250 can cover the number of training data pieces required for the first learning model to learn. The first reinforcement learner 257 outputs the learned first learning model that has undergone reinforcement learning using the second training data, which is the first reinforcement data, to the information processing apparatus 100.

The functions of the information processing apparatus 100 are implemented by execution of a recipe determination program by the CPU 101 included in the information processing apparatus 100. The information processing apparatus includes a first inferer 151 and a recipe determiner 153.

The recipe determiner 153 includes a first temporary condition determiner 155. The first temporary condition determiner 155 determines a first temporary condition. The first temporary condition is a driving condition to be input to the first learning model. The first temporary condition determiner 155 determines a state condition based on the information set for driving the substrate processing device 1 and a sensor value detected by each of the various sensors included in the substrate processing device 1. The first temporary condition determiner 155 acquires the characteristic information representing the characteristic of a liquid mixture supplied to the substrate processing device 1. The characteristic information may be acquired from the substrate processing device 1 or may be acquired as a predetermined value.

Further, the first temporary condition determiner 155 sets a random value as a value of each setting item of a recipe. The first temporary condition determiner 155 determines a first temporary condition including a recipe in which a random value is set for each setting item and a state condition. The first temporary condition determiner 155 outputs the first temporary condition to the first inferer 151.

The first inferer 151 infers the film-thickness characteristic using the learned first learning model generated by the learning device 200. The first inferer 151 provides the first temporary condition to the first learning model and outputs the film-thickness characteristic inferred by the first learning model to the recipe determiner 153.

In a case in which the film-thickness characteristic received from the first inferer 151 indicates a value included in the allowable range, the recipe determiner 153 determines a recipe based on the first temporary condition output to the first inferer 151. The recipe set in the first temporary condition is determined as the recipe for driving the substrate processing device 1. The first temporary condition determiner 155 repeats to determine a new first temporary condition until a recipe is determined by the recipe determiner 153. The recipe determiner 153 provides the determined recipe to the substrate processing device 1 and drives the substrate processing device 1 in accordance with the recipe.

(3) Process Flow

Figure 5:
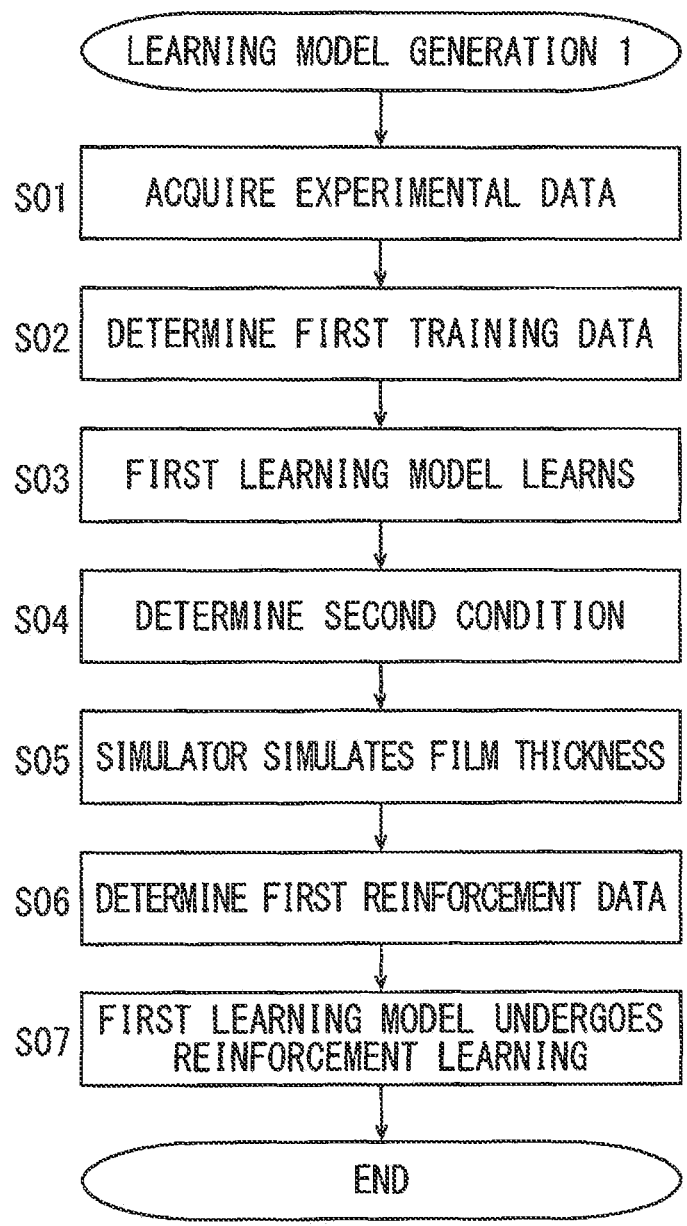
FIG. 5 is a flowchart showing one example of a flow of a learning model generation process.

FIG. 5 is a flowchart showing one example of a flow of a learning model generation process. The learning model generation process is a process executed by the CPU included in the learning device 200 when the CPU included in the learning device 200 executes the learning program. With reference to FIG. 5, the CPU included in the learning device 200 acquires experimental data (step S02), and the process proceeds to the step S02. In a case in which receiving the experimental data from the substrate processing device 1, the CPU included in the learning device 200 acquires the experimental data. In a case in which a recording medium such as a CD-ROM that records the experimental data is attached, the CPU included in the learning device 200 reads the experimental data from the CD-ROM. The experimental data includes a first condition and a film thickness, which is a result of experiment.

First training data is determined in the step S02, and the process proceeds to the step S03. A film-thickness characteristic is determined based on the liquid film thickness of or the solid film thickness included in the experimental data, and the first training data including the first condition included in the experimental data and the film-thickness characteristic is determined. For example, the film-thickness characteristic is determined by the comparison between the liquid film thickness or the solid film thickness included in the experimental data and a predetermined allowable range.

The CPU included in the learning device 200 causes a first learning model to learn in the step S03, and the process proceeds to the step S04. The first training data is provided to the first learning model, and the learned first learning model is generated.

A second condition is determined in the step S04, and the process proceeds to the step S05. The second condition has the same condition item as that of the first condition included in the experimental data and has a different value. Here, a plurality of second conditions are determined.

The simulator simulates the liquid film thicknesses or the solid film thickness of a liquid mixture in the step S05, and the process proceeds to the step S06. The second conditions generated in the step S04 are input to the simulator, and the liquid film thicknesses or the solid film thickness is calculated. Thus, the liquid film thickness or the solid film thickness is calculated for each of the plurality of second conditions.

First reinforcement data is determined in the step S06, and the process proceeds to the step S07. In the step S05, a film-thickness characteristic is determined for each of the plurality of second conditions based on the liquid film thickness or the solid film thickness calculated for each of the plurality of second conditions. The film-thickness characteristic is determined by comparison between the liquid film thickness or the solid film thickness and the predetermined allowable range. Further, the first reinforcement data (the second training data) including a second condition and a film-thickness characteristic is determined. Therefore, the same number of first reinforcement data pieces as the number of second conditions generated in the step S04 are determined.

The CPU included in the learning device 200 causes the first learning model to undergo reinforcement learning in the step S07, and the process ends. The first reinforcement data is provided to the learned first learning model that has learned in the step S03, and the learned first learning model is reinforced.

Figure 6:
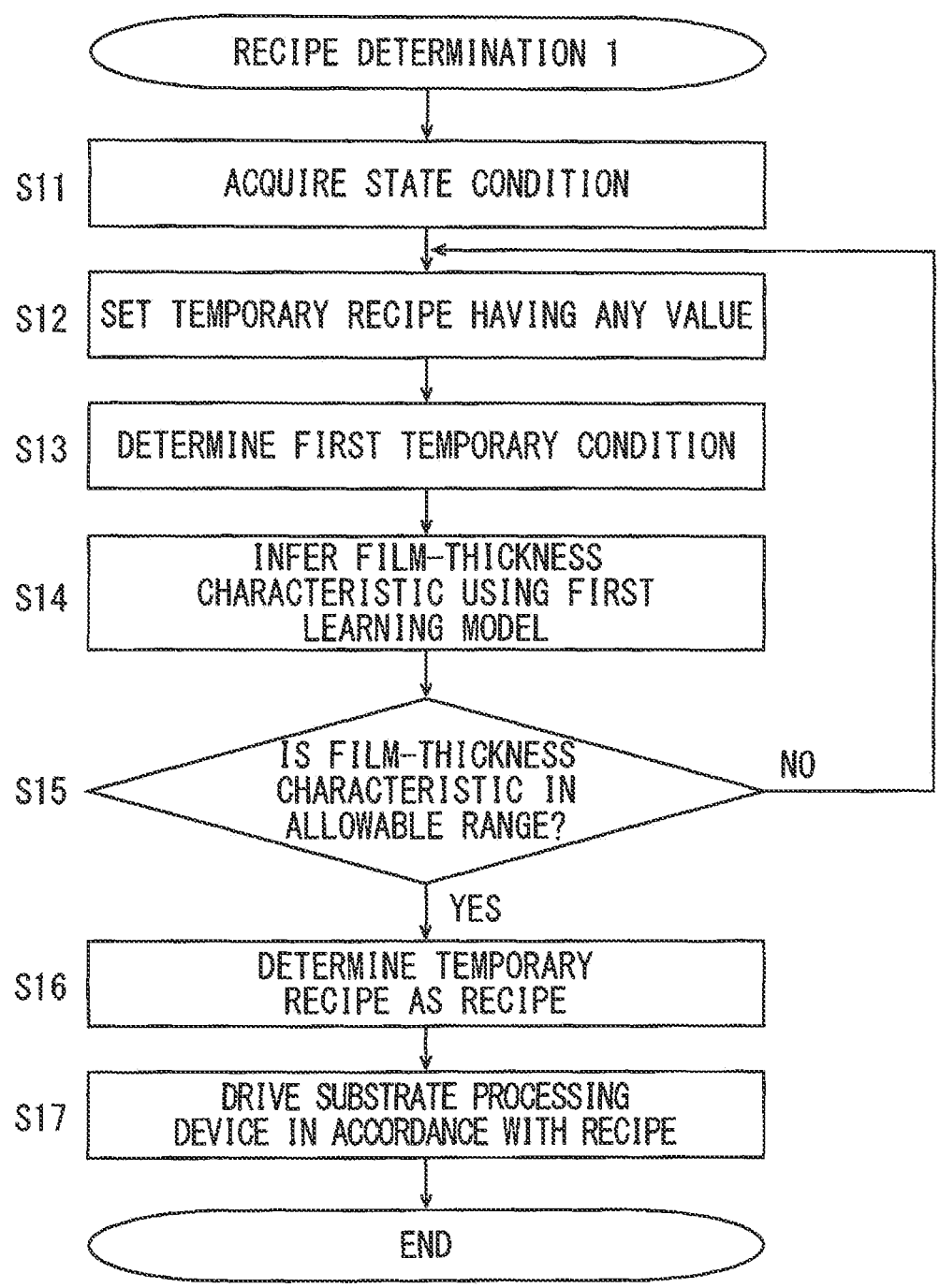
FIG. 6 is a flowchart showing one example of a flow of a recipe determination process.

FIG. 6 is a flowchart showing one example of a flow of a recipe determination process. The recipe determination process is a process executed by the CPU 101 when the CPU 101 included in the information processing apparatus 100 executes a recipe determination program. With reference to FIG. 6, the CPU 101 included in the information processing apparatus 100 acquires a state condition (step S11), and the process proceeds to the step S12. The state condition includes an environmental condition and characteristic information of a liquid mixture. The environmental condition is determined based on a value detected by a sensor included in the substrate processing device 1. The characteristic information of a liquid mixture is determined based on a value set in the substrate processing device 1 or a value detected by the sensor included in the substrate processing device 1.

A temporary recipe having any value is determined in the step S12, and the process proceeds to the step S13. The temporary recipe having a random value set as a value for each setting item of the recipe is determined.

A first temporary condition is determined in the step S13, and the process proceeds to the step S14. The first temporary condition including the state condition acquired in the step S11 and the temporary recipe determined in the step S12 is determined.

In the step S14, the film-thickness characteristic is inferred by the first learning model. The first temporary condition is provided to the first learning model, and the film-thickness characteristic inferred by the first learning model is acquired.

In the step S15, whether the film-thickness characteristic is included in an allowable range is determined. If the film-thickness characteristic inferred in the step S14 indicates being included in the allowable range, the process proceeds to the step S16. If not, the process returns to the step S12.

In the step S16, the temporary recipe included in the first temporary condition determined in the step S13 is determined as a recipe for driving the substrate processing device 1, and the process proceeds to the step S17. In the step S17, the substrate processing device 1 is driven in accordance with the determined recipe, and the process ends.

(4) Substrate Processing Device

Figure 7:
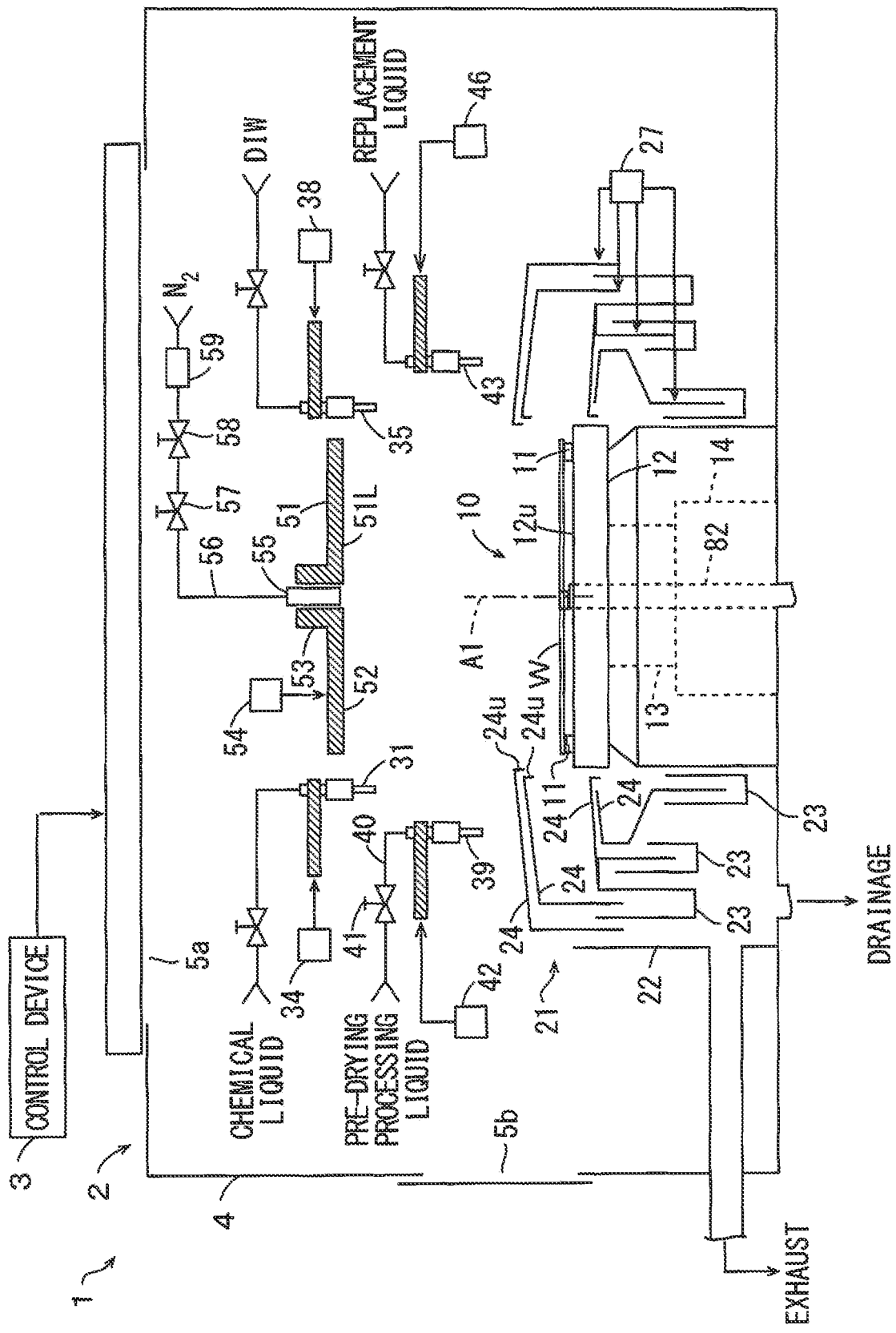
FIG. 7 is a schematic diagram of the inside of a processing unit included in the substrate processing device as viewed horizontally.

FIG. 7 is a schematic diagram of the inside of a processing unit included in the substrate processing device as viewed horizontally. The processing unit 2 is controlled by a control device 3. The control device 3 can communicate with the information processing apparatus 100. The processing unit 2 includes a box-shaped chamber 4, a spin chuck 10 that rotates one substrate W about a rotation axis Al extending vertically through the center portion of the substrate W while horizontally holding the substrate W in the chamber 4 and a cylindrical processing cup 21 surrounding the spin chuck 10 about the rotation axis Al.

The spin chuck 10 includes a disc-shaped spin base 12 held in a horizontal attitude, a plurality of chuck pins 11 that hold the substrate W in a horizontal attitude above the spin base 12, a spin shaft 13 extending downwardly from the center portion of the spin base 12 and a spin motor 14 that rotates the spin base 12 and the plurality of chuck pins 11 by rotating the spin shaft 13.

The processing cup 21 includes a plurality of guards 24 that receive a processing liquid discharged outwardly from the substrate W, a plurality of cups 23 that receive the processing liquid guided downwardly by the plurality of guards 24 and a cylindrical outer wall member 22 that surrounds the plurality of guards 24 and the plurality of cups 23. The plurality of guards 24 can be lifted or lowered individually by a guard lifting-lowering unit 27.

The processing unit 2 includes a chemical liquid nozzle 31 that discharges a chemical liquid, a rinse liquid nozzle 35 that discharges a rinse liquid, a pre-drying processing liquid nozzle 39 that discharges a pre-drying processing liquid and a replacement liquid nozzle 43 that discharges a replacement liquid. The chemical liquid nozzle 31, the rinse liquid nozzle 35, the pre-drying processing liquid nozzle 39 and the replacement liquid nozzle 43 can be horizontally and independently moved in the chamber 4 by nozzle moving units 34, 38, 42, 46 respectively provided to correspond to the nozzles.

The pre-drying processing liquid nozzle 39 is connected to a pre-drying processing liquid pipe 40 that guides a processing liquid to the pre-drying processing liquid nozzle 39. When a pre-drying processing liquid valve 41 provided in the pre-drying processing liquid pipe 40 is opened, a pre-drying processing liquid is continuously discharged downwardly from the outlet port of the pre-drying processing liquid nozzle 39. The pre-drying processing liquid is a liquid mixture including a sublimable substance equivalent to a solute and a solvent miscible with a sublimable substance.

The pre-drying processing liquid nozzle 39 is connected to the nozzle moving unit 42. The nozzle moving unit 42 moves the pre-drying processing liquid nozzle 39 in at least one of a vertical direction and a horizontal direction. The nozzle moving unit 42 horizontally moves the pre-drying processing liquid nozzle 39 between a processing position at which the pre-drying processing liquid discharged from the pre-drying processing liquid nozzle 39 is supplied to the upper surface of the substrate Wand a waiting position at which the pre-drying processing liquid nozzle 39 is located around the processing cup 21 in a plan view.

The processing unit 2 includes a disc-shaped shielding member 51 arranged above the spin chuck 10. The shielding member 51 includes a disc portion 52 arranged horizontally above the spin chuck 10. The shielding member 51 is horizontally supported by a cylindrical support shaft 53 extending upwardly from the center portion of the disc portion 52. The center axis of the disc portion 52 is arranged on the rotation axis Al of the substrate W. The lower surface of the disc portion 52 is equivalent to a lower surface 51 L of the shielding member 51. The lower surface 51L of the shielding member 51 is parallel to the upper surface of the substrate W and has an outer diameter equal to or larger than that of the substrate W.

The shielding member 51 is connected to a shielding member lifting-lowering unit 54 that vertically lifts or lowers the shielding member 51. The shielding member lifting-lowering unit 54 moves the shielding member 51 to any position from an upper position (the position shown in FIG. 7) and a lower position.

A center nozzle 55 is arranged in a through hole vertically penetrating the central portion of the shielding member 51. The center nozzle 55 is lifted or lowered together with the shielding member 51. The center nozzle 55 is connected to an upper gas pipe 56 that guides an inert gas to the center nozzle 55. The substrate processing device 1 includes an upper temperature regulator 59 that heats or cools the inert gas discharged from the center nozzle 55. When an upper gas valve 57 provided in the upper gas pipe 56 is opened, the inert gas is continuously discharged downwardly from the outlet port of the center nozzle 55 at a flow rate corresponding to an opening degree of a flow rate adjustment valve 58 that changes the flow rate of the inert gas. The inert gas discharged from the center nozzle 55 is a nitrogen gas.

Figure 8:
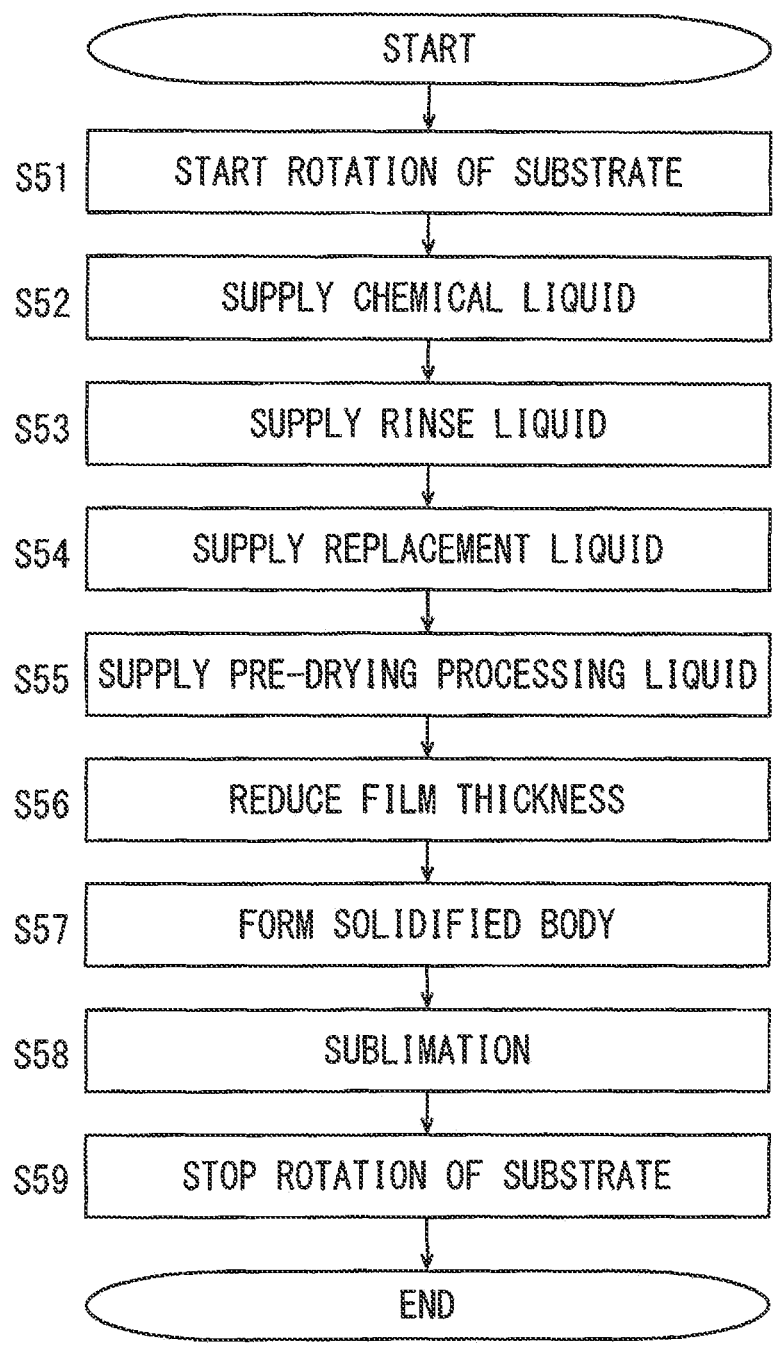
FIG. 8 is a diagram for explaining one example of a substrate process executed by the substrate processing device.

FIG. 8 is a diagram for explaining the steps in regard to one example of a substrate process executed by the substrate processing device 1. When a substrate W is processed by the substrate processing device 1, the substrate W is carried into the chamber 4 and held by the spin chuck 10. Thereafter, the guard lifting-lowering unit 27 lifts at least one guard 24 from a lower position to an upper position. The surface of the substrate W is a surface on which a device such as a transistor or a capacitor is formed and on which a pattern is formed.

In the step S51, the spin motor 14 is driven, and the rotation of the substrate W is started. In the next step S52, a chemical liquid supply step of supplying a chemical liquid to the upper surface of the substrate W to form a liquid film of the chemical liquid covering the entire upper surface of the substrate W is performed. Specifically, the chemical liquid nozzle 31 is moved from a waiting position to a processing position, discharges the chemical liquid for a predetermined period of time and then moves to the waiting position. The chemical liquid discharged from the chemical liquid nozzle 31 collides with the upper surface of the rotating substrate W and then flows outwardly along the upper surface of the substrate W due to a centrifugal force.

In the step S53, a rinse liquid supply step of supplying pure water, which is one example of a rinse liquid, to the upper surface of the substrate W to wash off the chemical liquid on the substrate W is performed. Specifically, the rinse liquid nozzle 35 is moved from a waiting position to a processing position, discharges the rinse liquid for a predetermined period of time and then moves to the waiting position. The pure water discharged from the rinse liquid nozzle 35 collides with the upper surface of the rotating substrate W and then flows outwardly along the upper surface of the substrate W due to a centrifugal force.

In the step S54, a replacement liquid supply step of supplying a replacement liquid that is miscible with both of the rinsing liquid and the pre-drying processing liquid to the upper surface of the substrate W to replace the pure water on the substrate W with the replacement liquid. Specifically, the replacement liquid nozzle 43 is moved from a waiting position to a processing position, discharges the replacement liquid for a predetermined period of time and then moves to the waiting position. The replacement liquid discharged from the replacement liquid nozzle 43 collides with the upper surface of the substrate W and then flows outwardly along the upper surface of the substrate W due to a centrifugal force. The pure water on the substrate W is replaced with the replacement liquid discharged from the replacement liquid nozzle 43. Thus, a liquid film of the replacement liquid covering the entire upper surface of the substrate W is formed.

In the step S55, a pre-drying processing liquid supply step of supplying a pre-drying processing liquid to the upper surface of the substrate W to form a liquid film of the pre-drying processing liquid on the substrate W is performed. Specifically, the nozzle moving unit 42 moves the pre-drying processing liquid nozzle 39 from a waiting position to a processing position. Thereafter, the pre-drying processing liquid valve 41 is opened, and the pre-drying processing liquid nozzle 39 starts to discharge the pre-drying processing liquid. Before the discharge of the pre-drying processing liquid is started, the guard lifting-lowering unit 27 may vertically move at least one guard 24 in order to switch a guard 24 that receives the liquid to be discharged from the substrate W. When a predetermined period of time elapses since the pre-drying processing liquid valve 41 is opened, the pre-drying processing liquid valve 41 is closed and the discharge of the pre-drying processing liquid is stopped. Thereafter, the nozzle moving unit 42 moves the pre-drying processing liquid nozzle 39 to the waiting position.

The pre-drying processing liquid discharged from the pre-drying processing liquid nozzle 39 collides with the upper surface of the substrate W that is rotating at a liquid supply speed and then flows outwardly along the upper surface of the substrate W due to a centrifugal force. The replacement liquid on the substrate W is replaced with the pre-drying processing liquid discharged from the pre-drying processing liquid nozzle 39. Thus, a liquid film of the pre-drying processing liquid covering the entire upper surface of the substrate W is formed. When the pre-drying processing liquid nozzle 39 is discharging the pre-drying processing liquid, the nozzle moving unit 42 moves a landing position of the pre-drying processing liquid with respect to the upper surface of the substrate W such that the landing position passes through the center portion and the outer periphery of the substrate W.

In the step S56, a film-thickness reducing step of removing part of the pre-drying processing liquid on the substrate W to reduce the film-thickness (the thickness of a liquid film) of the pre-drying processing liquid on the substrate W while maintaining the entire upper surface of the substrate W being covered with the liquid film of the pre-drying processing liquid. Specifically, the spin motor 14 rotates the substrate W with the shielding member 51 located at the lower position. The pre-drying processing liquid on the substrate W is discharged outwardly from the substrate W by a centrifugal force even after the discharge of the pre-drying processing liquid is stopped. Therefore, the thickness of the liquid film of the pre-drying processing liquid on the substrate W is reduced. When the pre-drying processing liquid on the substrate W is discharged to some extent, a discharge amount of the pre-drying processing liquid from the substrate W per unit time is reduced to 0 or substantially 0.

In the step S57, a solidified-body forming step of forming a solidified body including a sublimable substance on the substrate W by solidifying the pre-drying processing liquid on the substrate W is performed. Specifically, the spin motor 14 rotates the substrate W with the shielding member 51 located at the lower position. Further, the upper gas valve 57 is opened to cause the center nozzle 55 to start discharging a nitrogen gas. In the solidified-body forming step, evaporation of the pre-drying processing liquid is promoted, and the pre-drying processing liquid on the substrate W partially evaporates. Therefore, the film thickness of the pre-drying processing liquid is gradually reduced while the concentration of a sublimable substance gradually increases.

In the step S58, a sublimation step of sublimating the solidified body on the substrate W to remove the solidified body from the upper surface of the substrate W is performed. Specifically, the spin motor 14 rotates the substrate W with the shielding member 51 located at the lower position. Further, the upper gas valve 57 is opened to cause the center nozzle 55 to start discharging a nitrogen gas. When the sublimation process is completed, the spin motor 14 is stopped, and the rotation of the substrate W is stopped (step S59).

(5) Specific Example of Driving Condition

The simulator 250 simulates the movement of a pre-drying processing liquid discharged to a substrate W during execution of the series of processes executed in the substrate processing device 1. This series of processes include the replacement liquid supply step (step S54), the pre-drying processing liquid supply step (step S55), the film-thickness reducing step (step S56) and the solidified-body forming step (step S57) shown in FIG. 8. Therefore, the film thickness of a liquid film indicates the film thickness of a film of a replacement liquid or a pre-drying processing liquid, and the film thickness of a solid film indicates the film thickness of a film of a solidified body including a sublimable substance precipitated by evaporation of a solvent from the pre-drying processing liquid.

A driving condition for adjusting the simulator 250 and a driving condition for causing a first learning model to learn include a recipe that is set to cause the substrate processing device 1 to execute the series of processes, and a state condition indicating a state at a point in time at which the substrate processing device 1 starts to execute the series of processes.

<Recipe>

A recipe includes a chemical liquid flow rate, a nozzle discharge position, a nozzle discharge diameter, a nozzle scan speed, nozzle scan position information (a temporal change of the nozzle position), a substrate rotation speed, a processing period of time, a drying gas ($N_2$) flow rate and a drying gas ($N_2$) discharge position.

The chemical liquid flow rate is an amount of a replacement liquid discharged from the replacement liquid nozzle 43 per unit time. Further, the chemical liquid flow rate is an amount of a pre-drying processing liquid discharged from the pre-drying processing liquid nozzle 39 per unit time and is represented here by an opening degree of the pre-drying processing liquid valve 41. The nozzle discharge position in regard to a replacement liquid is a position in a height direction of the replacement liquid nozzle 43 with respect to a substrate W and is defined by the nozzle moving unit 46. The nozzle discharge position for a pre-drying processing liquid is a position in a height direction of the pre-drying processing liquid nozzle 39 with respect to a substrate W and is defined by the nozzle moving unit 42. The nozzle discharge diameter for a replacement liquid is the inner diameter of the outlet port of the replacement liquid nozzle 43 and is defined by the replacement liquid nozzle 43. The nozzle discharge diameter for a pre-drying processing liquid is the inner diameter of the outlet port of the pre-drying processing liquid nozzle 39 and is defined by the pre-drying processing liquid nozzle 39.

The nozzle scan speed for a replacement liquid is a speed at which the replacement liquid nozzle 43 carries out scanning movement and is defined by the nozzle moving unit 46. The nozzle scan speed for a pre-drying processing liquid is a speed at which the pre-drying processing liquid nozzle 39 carries out scanning movement and is defined by the nozzle moving unit 42. The nozzle scan position information (the temporal change of the nozzle scan position) in regard to a replacement liquid represents the temporal change of the position of the replacement liquid nozzle 43 with respect to a substrate W and is defined by the nozzle moving unit 46. The nozzle scan position information (the temporal change of the nozzle scan position) in regard to a pre-drying processing liquid represents the temporal change of the position of the pre-drying processing liquid nozzle 39 with respect to a substrate Wand is defined by the nozzle moving unit 42.

The number of times a substrate rotates is the rotation speed of the spin motor 14. The processing period of time includes a chemical liquid discharging period of time, a chemical liquid shake-off period of time and a solvent drying period of time. A chemical liquid discharging period of time is a period of time during which a replacement liquid is discharged from the replacement liquid nozzle 43 in the replacement liquid supplying step, and a period of time during which a pre-drying processing liquid is discharged from the pre-drying processing liquid nozzle 39 in the pre-drying processing liquid supplying step. The chemical liquid shake-off period of time is a period of time during which the spin motor 14 rotates a substrate W with the shielding member 51 located at the lower position in the film-thickness reducing step. The solvent drying period of time is a period of time during which the spin motor 14 rotates a substrate W with the shielding member 51 located at the lower position and a nitrogen gas discharged from the center nozzle 55, in the solidified-body forming step.

The drying gas ($N_2$) flow rate is an amount of a drying gas ($N_2$) discharged from the center nozzle 55 per unit time and is represented here by an opening degree of the flow rate adjustment valve 58. The drying gas ($N_2$) discharge position is the position of the center nozzle 55 with respect to a substrate W and is above the center of the substrate W in the present embodiment.

<State Condition>

A state condition includes a chemical liquid condition, a substrate condition, device configuration and an environmental condition. The chemical liquid condition is the information in regard to a replacement liquid and a pre-drying processing liquid, and includes viscosity, surface tension, a temperature, a concentration, a contact angle with respect to a substrate, a vapor pressure, heat of solidification, a saturation concentration and a diffusion coefficient. The substrate condition is the information in regard to a substrate W and includes a surface state (water repellency and hydrophilicity) and a contact angle with respect to a pre-drying processing liquid. The device configuration is the information in regard to the substrate processing device 1 and includes the position and shape of the processing cup 21 with respect to a substrate W, the position and shape of the spin chuck 10, the position and shape of the spin base 12, and the position and shape of the pre-drying processing liquid nozzle 39. The environmental condition is the information in regard to an environment in which a substrate W is processed and includes an internal pressure of the chamber 4 and a temperature in the chamber 4.

(6) Effects

In the processing system 300 in the first embodiment, the learning device 200 acquires the film thickness of a solid or a liquid formed on a substrate, which is obtained when the substrate processing device 1 is driven under a first condition, and causes a learning model to learn first training data including the film-thickness characteristic indicating the characteristic of solid film thickness or liquid film thickness and a first condition. Therefore, it is possible to generate a learning model for inferring the film-thickness characteristic indicating the characteristic of the film thickness of a solid or a liquid formed on a substrate in a process to which a sublimation drying technique having relatively many parameters is applied.

Further, the learning device 200 acquires a film-thickness characteristic indicating the characteristic of the film thickness of a solid or a liquid formed on a substrate, which is obtained when the simulator 250 is driven under a second condition different from the first condition, and causes the learning model to further learn second training data including a second condition and the film-thickness characteristic. Thus, because the second training data can be easily generated, the learning model can be generated easily.

The first training data is classified into a plurality of channels in accordance with the surface state of a substrate, the shape of a pattern formed on the substrate and the physical properties of liquid. Therefore, a learning model is generated for each of the plurality of channels, so that accuracy of inference of the learning model is improved.

The information processing apparatus 100 determines a recipe using the learning model generated by the learning device 200. The recipe for driving the substrate processing device 1 can be easily determined.

Further, in a driving condition, a value is set for each of a plurality of items. The information processing apparatus 100 determines a recipe based on a temporary condition in a case in which the temporary condition in which a prescribed value is set for part of a plurality of items and any values are set for other items is provided to the learning model as a driving condition, and a film-thickness characteristic inferred by the learning model satisfies an allowable condition. Therefore, in a case in which the film-thickness characteristic inferred by the learning model to which the temporary condition is provided as the driving condition satisfies the allowable condition, the recipe is determined based on the temporary condition. Therefore, it is possible to easily obtain the recipe for driving the substrate processing device using the learning model.

Second Embodiment

A processing system 300 according to a second embodiment is obtained when the function of correcting a recipe based on an intermediate processing state detected by a sensor while a substrate processing device 1 performs a series of processes is added to the processing system 300 in the first embodiment. Differences from the processing system 300 in the first embodiment will be mainly described below.

In the processing system 300 in the second embodiment, a pressure and a temperature in the chamber 4 is taken as an intermediate processing state, by way of example. A pressure is detected by a pressure sensor arranged in the chamber 4, and a temperature is detected by a temperature sensor arranged in the chamber 4.

Figure 9:
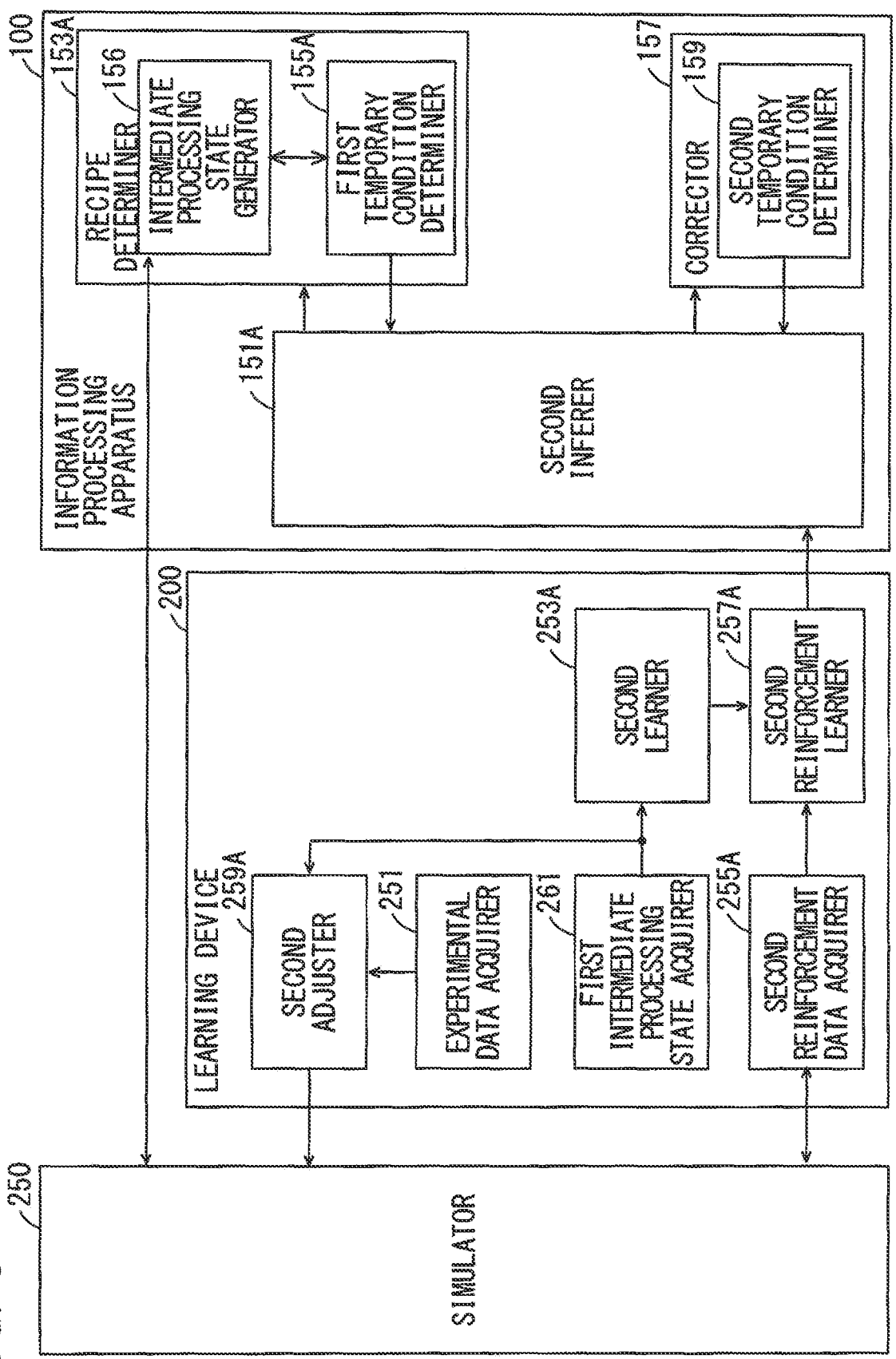
FIG. 9 is a diagram showing one example of the functional configuration of a processing system in a second embodiment.

FIG. 9 is a diagram showing one example of the functional configuration of a processing system in a second embodiment. With reference to FIG. 9, the differences from the functions shown in FIG. 3 are that, in a learning device 200, the first adjuster 259 is changed to a second adjuster 259A, the first reinforcement data acquirer 255 is changed to a second reinforcement data acquirer 255A, the first learner 253 is changed to a second learner 253A and the first reinforcement learner 257 is changed to a second reinforcement learner 257A, and a first intermediate processing state acquirer 261 is added. Further, in an information processing apparatus 100, the first inferer 151 is changed to a second inferer 151A, the recipe determiner 153 is changed to a recipe determiner 153A and a corrector 157 is added. Other functions are the same as those shown in FIG. 3. A description thereof will therefore not be repeated.

The first intermediate processing state acquirer 261 of a learning device 200 in the second embodiment acquires an intermediate processing state in a period during which the substrate processing device 1 executes a series of processes by experiment. The first intermediate processing state acquirer 261 acquires an intermediate processing state at a point in time at which a predetermined period of time has elapsed from the start of the series of processes executed by the substrate processing device 1. Specifically, the first intermediate processing state acquirer 261 acquires a temperature in the chamber 4 measured by the temperature sensor and a pressure in the chamber 4 measured by the pressure sensor as intermediate processing states. An intermediate processing state is paired with a first condition included in experimental data. The first intermediate processing state acquirer 261 outputs an intermediate processing state to the second adjuster 259A and the second learner 253A.

The second learner 253A generates first training data based on the experimental data and the intermediate processing state and causes a second learning model to learn the first training data. The first training data in the second embodiment includes a first condition, an intermediate processing state and a film-thickness characteristic. Hereinafter, the first training data including a first condition, an intermediate processing state and a film thickness characteristic is referred to as first training data including an intermediate processing state. The film-thickness characteristic is obtained by comparison of the liquid film thickness or the solid film thickness included in the experimental data with an allowable range.

First training data including an intermediate processing state is preferably classified into a plurality of channels in accordance with the state of a surface of a substrate, the shape of a pattern formed on the substrate and the physical properties of a liquid mixture applied to the substrate. It is possible to improve accuracy of inference by a second learning model by generating the second learning model for each of the plurality of channels.

The second adjuster 259A adjusts a simulator 250 based on experimental data and an intermediate processing state. The second adjuster 259A causes the simulator 250 to execute the movement of a liquid mixture on a substrate during execution of the series of processes by the substrate processing device 1 under a first condition included in the experimental data, and adjusts the simulator 250 such that a temperature and a pressure in the chamber during execution of the series of processes are close to intermediate processing states and a result of execution of the series of processes is close to the liquid film thickness or the solid film thickness included in the experimental data.

The second reinforcement data acquirer 255A acquires an intermediate processing state obtained when the simulator 250 is driven under a second condition, and a film-thickness characteristic indicating the characteristic of film thickness of a liquid or a solid that is obtained when the simulator 250 is driven under a second condition. The second condition has the same condition items as those of the first condition used in the experimental data but have different values. The second reinforcement data acquirer 255A generates the second condition in accordance with a predetermined rule. The second condition may be randomly generated. The second reinforcement data acquirer 255A acquires an intermediate processing state calculated by the simulator 250 before the series of processes are completed when the simulator 250 is driven under the second condition. A point in time at which an intermediate processing state is acquired is the same as a point in time at which an intermediate processing state is acquired by the first intermediate processing state acquirer 261. That is, an intermediate processing state is acquired when a predetermined period of time has elapsed from the start of the series of processes by the substrate processing device 1. The second reinforcement data acquirer 255A determines a film-thickness characteristic by comparing the liquid film thickness or the solid film thickness output by the simulator 250 with a predetermined allowable range. The second reinforcement data acquirer 255A outputs second reinforcement data (second training data) including the second condition, the intermediate processing state and the film-thickness characteristic to the second reinforcement learner 257A.

The second reinforcement learner 257A causes the learned second learning model, which the second learner 253A has caused to learn, to learn the second reinforcement data. Because the learned second learning model, which the second learner 253A has caused to learn, further learns the second reinforcement data, it is not necessary to prepare the number of first training data pieces including intermediate processing states required for the second learning model to learn, by experiment, the second learning model can be generated easily. In other words, the number of training data pieces required for the second learning model to learn can be covered by the second training data including an intermediate processing state generated by the simulator 250. The second reinforcement learner 257A outputs the learned second learning model to the information processing apparatus 100.

The recipe determiner 153A includes an intermediate processing state generator 156 and a first temporary condition determiner 155A. The first temporary condition determiner 155A determines a second temporary condition. The second temporary condition includes a driving condition and an intermediate processing state. The first temporary condition determiner 155A determines the driving condition. The first temporary condition determiner 155A determines a state condition based on the information set for driving the substrate processing device 1 and sensor values detected by various sensors included in the substrate processing device 1. The first temporary condition determiner 155A acquires characteristic information representing the characteristic of a liquid mixture supplied to the substrate processing device 1. Further, the first temporary condition determiner 155A sets a random value as a value for each setting item of a recipe. The first temporary condition determiner 155 determines a driving condition including a recipe having a random value set for each setting item and a state condition. The first temporary condition determiner 155A outputs the driving condition to the intermediate processing state generator 156 and acquires an intermediate processing state from the intermediate processing state generator 156.

The intermediate processing state generator 156 drives the simulator 250 under the driving condition received from the first temporary condition determiner 155A and acquires an intermediate processing state output by the simulator 250. The intermediate processing state generator 156 outputs the acquired intermediate processing state to the first temporary condition determiner 155A. A point in time at which an intermediate processing state is output by the simulator 250 is preferably the same as a point in time at which an intermediate processing state is acquired from the experimental data. Because an intermediate processing state is the information acquired before the substrate processing device 1 completes the series of processes, a period of time required for the simulator 250 to calculate the intermediate processing state is shorter than a period of time required for the simulator 250 to calculate a film thickness at a point in time at which the series of processes executed by the substrate processing device 1 ends. The first temporary condition determiner 155A outputs a second temporary condition including a driving condition and an intermediate processing state generated by the intermediate processing state generator 156 to the second inferer 151A.

The second inferer 151A infers a film-thickness characteristic using the learned second learning model generated by the learning device 200. The second inferer 151A provides the second temporary condition to the second learning model and outputs the film-thickness characteristic inferred by the second learning model to the recipe determiner 153A.

In a case in which the film-thickness characteristic received from the second inferer 151A indicates a value included in the allowable range, the recipe determiner 153A determines a recipe based on the second temporary condition output to the second inferer 151A. The recipe set in the second temporary condition is determined as a recipe for driving the substrate processing device 1. The first temporary condition determiner 155A repeats to determine a new second temporary condition until a recipe is determined by the recipe determiner 153A. The recipe determiner 153A provides a determined recipe to the substrate processing device 1 and drives the substrate processing device 1 in accordance with the recipe.

The corrector 157 includes a second temporary condition determiner 159. The second temporary condition determiner 159 acquires an intermediate processing state from the substrate processing device 1 that executes the series of processes in accordance with a recipe determined by the recipe determiner 153A. Specifically, the second temporary condition determiner 159 acquires a temperature in the chamber 4 measured by a temperature sensor included in the substrate processing device 1 and a pressure in the chamber 4 measured by a pressure sensor included in the substrate processing device 1 as intermediate processing states. Further, the second temporary condition determiner 159 determines a driving condition. The second temporary condition determiner 159 determines a state condition based on the information set for driving the substrate processing device 1 and sensor values detected by various sensors included in the substrate processing device 1. The second temporary condition determiner 159 acquires characteristic information representing the characteristic of a liquid mixture supplied to the substrate processing device 1. Further, the second temporary condition determiner 159 sets a random value as a value for each setting item of a recipe. The second temporary condition determiner 159 determines a driving condition including a recipe having a random value set for each setting item, and a state condition. The second temporary condition determiner 159 outputs a second temporary condition including an intermediate processing state acquired from the substrate processing device 1 and a driving condition to the second inferer 151A.

The second inferer 151A infers a film-thickness characteristic using the learned second learning model generated by the learning device 200. The second inferer 151A provides the second temporary condition to the second learning model and outputs the film-thickness characteristic inferred by the second learning model to the recipe determiner 153A.

In a case in which the film-thickness characteristic received from the second inferer 151A indicates a value included in the allowable range, the corrector 157 determines a new recipe based on the second temporary condition output to the second inferer 151A. The recipe set in the second temporary condition is determined as a new recipe for driving the substrate processing device 1. The second temporary condition determiner 159 repeats to determine a new second temporary condition until a new recipe is determined by the corrector 157. The corrector 157 updates a recipe determined by the recipe determiner 153A with a new recipe, provides the updated recipe to the substrate processing device 1 and drives the substrate processing device 1 in accordance with the recipe.

Figure 10:
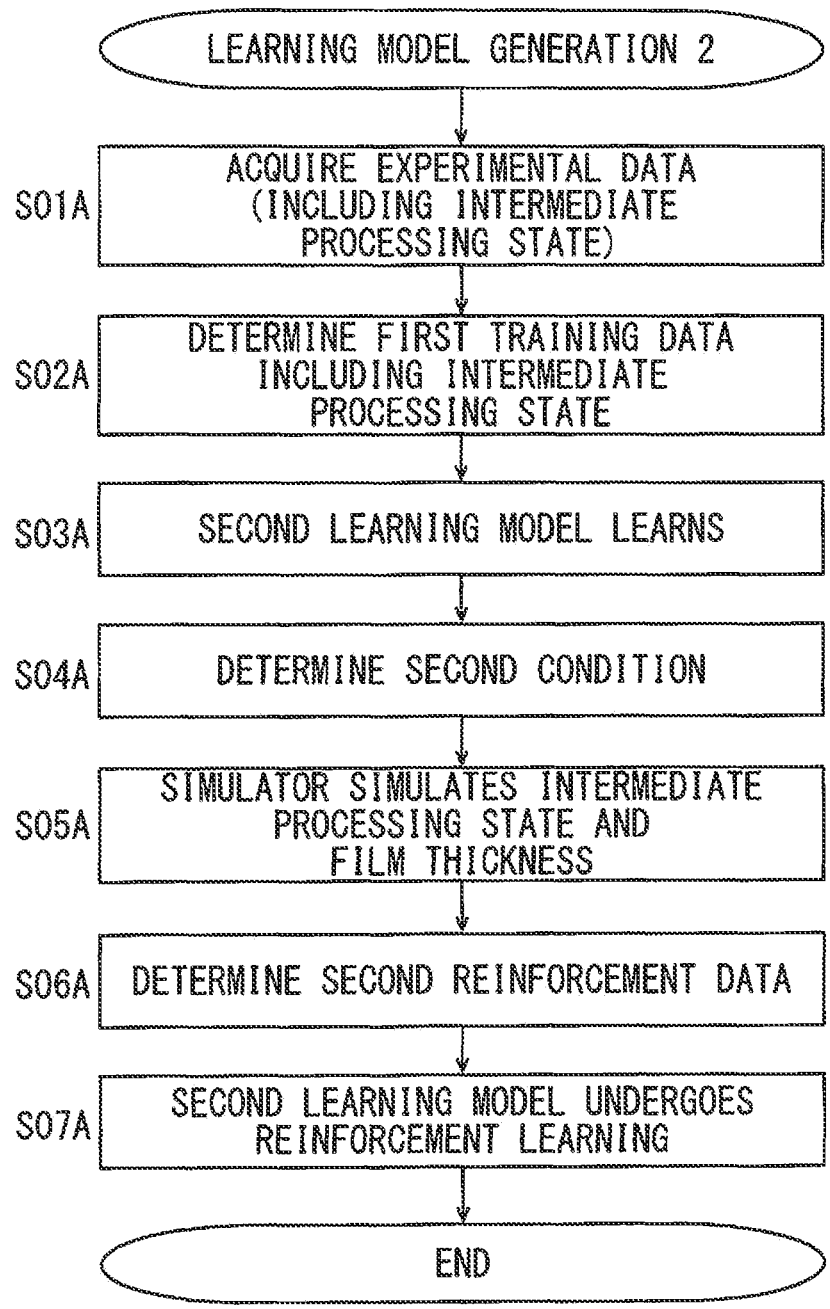
FIG. 10 is a flowchart showing one example of a flow of a learning model generation process in the second embodiment.

FIG. 10 is a flowchart showing one example of a flow of a learning model generation process in the second embodiment. With reference to FIG. 10, the CPU included in the learning device 200 acquires experimental data (step S01A), and the process proceeds to the step S02A. The experimental data acquired here includes an intermediate processing state. In a case in which receiving the experimental data from the substrate processing device 1, the CPU included in the learning device 200 acquires the experimental data. In a case in which a recording medium such as a CD-ROM that records the experimental data is attached, the CPU included in the learning device 200 reads the experimental data from the CD-ROM.

First training data including an intermediate processing state is determined in the step S02A, and the process proceeds to the step S03A. A film-thickness characteristic is determined based on the liquid film thickness or the solid film thickness included in the experimental data, and the first training data including an intermediate processing state is determined. The first training data including an intermediate processing state in the second embodiment includes an intermediate processing state in addition to a first condition and a film-thickness characteristic. The film-thickness characteristic is determined by the comparison between the liquid film thickness or the solid film thickness included in the experimental data and a predetermined allowable range. The first training data including an intermediate processing state is determined based on a first condition and an intermediate processing state that are included in the experimental data and a film-thickness characteristic determined based on the experimental data.

The CPU included in the learning device 200 causes the second learning model to learn in the step S03A, and the process proceeds to the step S04A. The first training data including an intermediate processing state is provided to the second learning model, and the learned second learning model is generated.

A second condition is determined in the step S04A, and the process proceeds to the step S05A. The second condition has the same condition item as that of the first condition included in the experimental data and has a different value. Here, a plurality of second conditions are determined.

In the step S05A, the simulator simulates an intermediate processing condition and a film thickness, and the process proceeds to the step S06A. The second conditions generated in the step S04 are input to the simulator, and an intermediate processing state, the film thickness of a liquid or a solid are calculated. Thus, an intermediate processing state, and the liquid film thickness or the solid film thickness are calculated for each of the plurality of second conditions.

Second reinforcement data is determined in the step S06A, and the process proceeds to the step S07A. In the step S05A, a film-thickness characteristic is determined for each of the plurality of second conditions based on the liquid film thickness or the solid film thickness calculated for each of the plurality of second conditions. The film-thickness characteristic is determined by comparison between the liquid film thickness or the solid film thickness and the predetermined allowable range. Further, the second reinforcement data including a second condition, an intermediate processing state and a film-thickness characteristic is determined. Therefore, the same number of second reinforcement data pieces as the number of second conditions generated in the step S04A are determined.

In the step S07A, the CPU included in the learning device 200 causes the second learning model to undergo reinforcement learning and ends the process. The second reinforcement data is provided to the learned second learning model in the step S03A, and the learned second learning model is reinforced.

Figure 11:
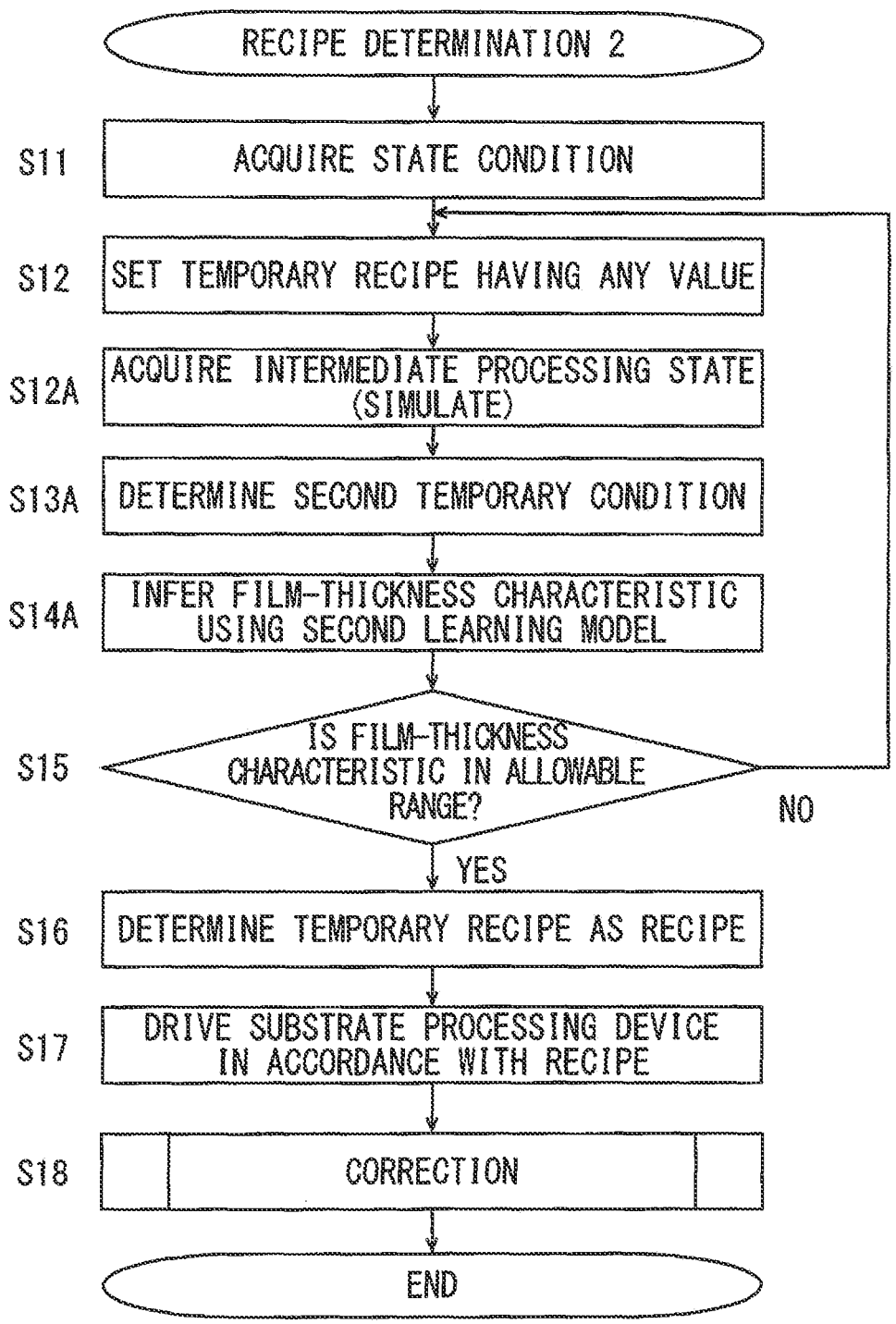
FIG. 11 is a flowchart showing one example of a flow of a recipe determination process in the second embodiment.

FIG. 11 is a flowchart showing one example of a flow of a recipe determination process in the second embodiment. With reference to FIG. 11, the difference from the process shown in FIG. 6 is that the steps S13 and S14 are changed to the steps 513A and 514A, the step 512A is added between the step S12 and the step S13A, and the step S18 is added after the step S17. The other processes are the same as those shown in FIG. 6. A description thereof will therefore not be repeated here.

After setting a temporary recipe in the step S12, a CPU 101 included in an information processing apparatus 100 acquires an intermediate processing state (step S12A). A simulator 250 is driven under a driving condition, and an intermediate processing state output by the simulator 250 is acquired. A point in time at which an intermediate processing state is acquired from the simulator 250 is preferably the same as a point in time at which an intermediate processing state is acquired in the experimental data. The driving condition includes a state condition acquired in the step S11 and a temporary recipe set in the step S12.

A second temporary condition is determined in the next step S13A, and the process proceeds to the step S14A. The second temporary condition including the state condition acquired in the step S11, the temporary recipe determined in the step S12 and the intermediate processing state acquired in the step S12A is determined.

In the step S14A, a film-thickness characteristic is inferred by the second learning model. The second temporary condition is provided to the second learning model, and the film-thickness characteristic inferred by the second learning model is acquired.

In the step S15, whether the film-thickness characteristic is included in an allowable range is determined. If the film-thickness characteristic inferred in the step S14A indicates being included in the allowable range, the process proceeds to the step S16. If not, the process returns to the step S12.

In the step S16, the temporary recipe included in the second temporary condition determined in the step S13A is determined as a recipe for driving the substrate processing device 1, and the process proceeds to the step S17. In the step S17, the substrate processing device 1 is driven in accordance with the determined recipe, and the process proceeds to the step S18. In the step S18, a correction process is executed, and the process ends.

Figure 12:
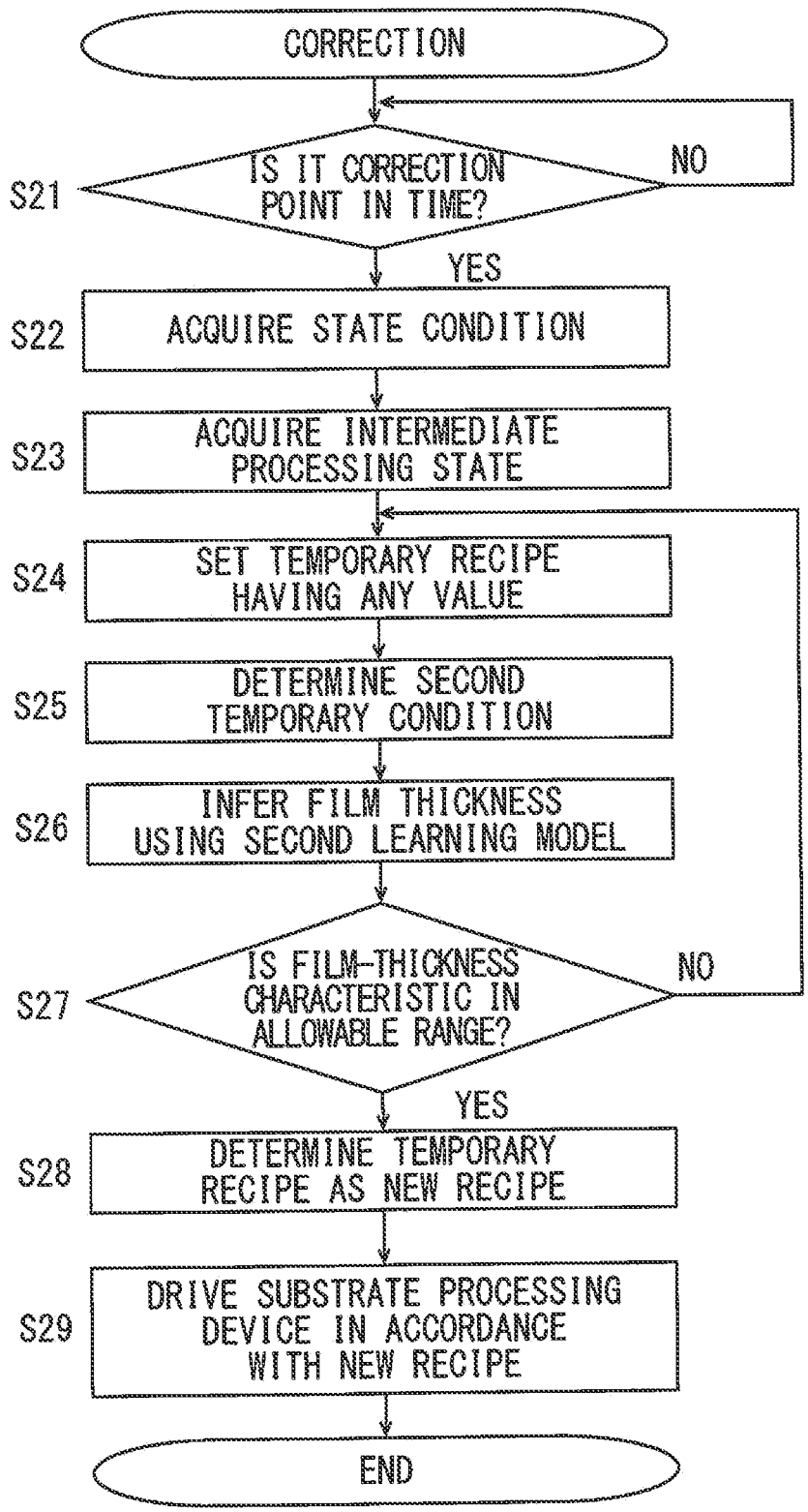
FIG. 12 is a flowchart showing one example of a flow of a correction process in the second embodiment.

FIG. 12 is a flowchart showing one example of a flow of a correction process in the second embodiment. With reference to FIG. 12, in the correction process, the CPU 101 included in the information processing apparatus 100 determines whether a current point in time is a point in time at which correction is to be made (step S21). The CPU 101 waits until a current point in time is a correction point in time (NO in the step S21). When the current point in time is a correction point in time, the process proceeds to the step S22. The correction point in time is a predetermined point in time. The correction point in time is preferably the same as a point in time at which an intermediate processing state is measured in the experimental data.

In the step S22, a state condition is acquired, and the process proceeds to the step S23. The state condition is determined based on an output value of a sensor included in the substrate processing device 1. An intermediate processing state is acquired in the step S23, and the process proceeds to the step S24. An intermediate processing state is acquired based on an output value of a sensor included in the substrate processing device 1. Intermediate processing states include a temperature in the chamber 4 determined based on the output value of a temperature sensor and a pressure in the chamber 4 determined based on an output value of a pressure sensor.

A temporary recipe having any value is determined in the step S24, and the process proceeds to the step S25. The temporary recipe having a random value set as a value for each setting item of the recipe is determined.

A second temporary condition is determined in the step S25, and the process proceeds to the step S26. The second temporary condition including the state condition acquired in the step S22, the temporary recipe determined in the step S24 and the intermediate processing state acquired in the step S23 is determined.

In the step S26, the film-thickness characteristic is inferred by the second learning model. The second temporary condition is provided to the second learning model, and the film-thickness characteristic inferred by the second learning model is acquired.

In the step S27, whether the film-thickness characteristic is included in an allowable range is determined. If the film-thickness characteristic inferred in the step S26 indicates being included in the allowable range, the process proceeds to the step S28. If not, the process returns to the step S24.

In the step S28, the temporary recipe included in the second temporary condition determined in the step S25 is determined as a new recipe for driving the substrate processing device 1, and the process proceeds to the step S29. In the step S29, the temporary recipe set in the step S24 is determined as a new recipe for driving the substrate processing device 1. In the step S29, the CPU 101 provides a new recipe to the substrate processing device 1 and drives the substrate processing device 1 in accordance with the new recipe, and the process returns the recipe determination process.

The information processing apparatus 100 in the second embodiment may have the functions including in the simulator 250. In this case, the simulator 250 is not required.

The processing system 300 in the second embodiment achieves the following effects in addition to the effects achieved by the processing system 300 in the first embodiment.

The learning device 200 acquires an intermediate processing state at a point in time before a series of processes executed by the substrate processing device is completed, and causes a learning model to learn first training data including the intermediate processing state. Therefore, the accuracy of inference by the learning model is improved.

Further, the learning device 200 further acquires an intermediate processing state at a point in time before a series of processes executed by a simulator in a case in which the simulator is driven under a second condition different from a first condition is completed, and causes the learning model to learn second training data including the intermediate processing state. Thus, because the second training data can be easily generated, the learning model can be generated easily. Further, because the learning model undergoes reinforcement learning with use of the second training data including the intermediate processing state, it is easy to generate the learning model with improved accuracy of inference.

Further, the learning device adjusts the simulator using any one of the first condition, the intermediate processing state, and the solid film thickness or the liquid film thickness acquired by the experiment. Therefore, the accuracy of the simulator can be improved.

In the information processing apparatus 100, a driving condition further includes an intermediate processing state at a point in time before a series of processes executed by the substrate processing device 1 is completed. The information processing apparatus 100 acquires an intermediate processing state at a point in time before the series of processes executed by the substrate processing device 1 in accordance with a recipe is completed, provides the intermediate processing state and a temporary condition in which a prescribed value is set for part of a plurality of items and any values are set for the other items to a learning model as a driving condition, and determines a new recipe based on the temporary condition in a case in which a film-thickness characteristic inferred by a learning model satisfies an allowable condition. Therefore, the new recipe is determined based on the intermediate processing state at a point in time before the series of processes executed by the substrate processing device 1 in accordance with the recipe is completed. Therefore, in a case in which a driving condition changes while the substrate processing device 1 executes the series of processes, it is possible to cause the film-thickness characteristic of a solid film or a liquid film formed by the substrate processing device 1 to fall in an allowable range.

Third Embodiment

While experimental data includes an intermediate processing state in the second embodiment, experimental data does not include an intermediate processing state in a processing system 300 in a third embodiment.

Figure 13:
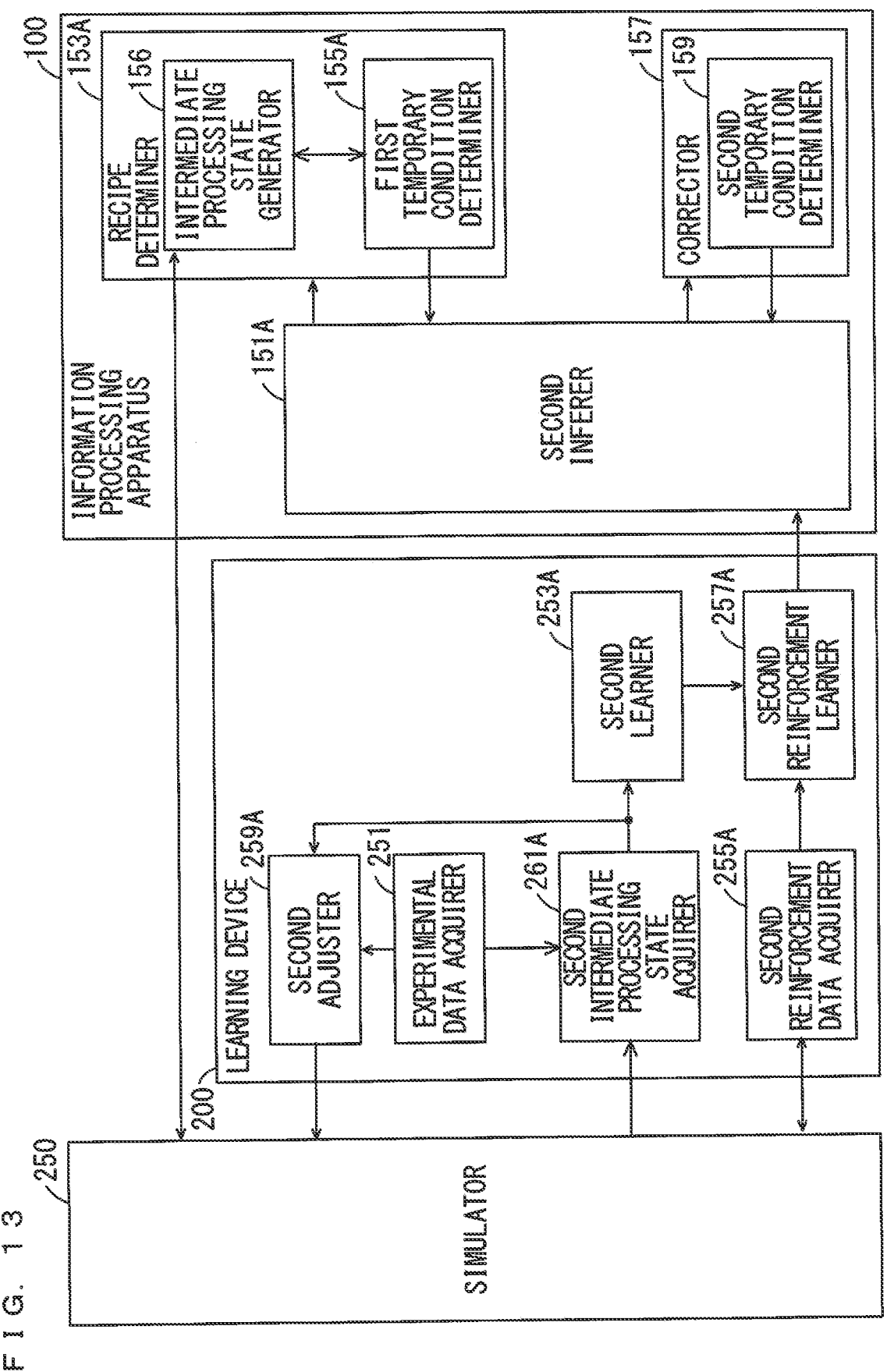
FIG. 13 is a diagram showing one example of the functional configuration of a processing system in a third embodiment.

FIG. 13 is a diagram showing one example of the functional configuration of a processing system in a third embodiment. With reference to FIG. 13, the difference from the functions shown in FIG. 9 is that the first intermediate processing state acquirer 261 is changed to a second intermediate processing state acquirer 261A. The other functions are the same as those shown in FIG. 9. A description thereof will therefore not be repeated.

Experimental data acquired by an experimental data acquirer 251 does not include an intermediate processing state. Therefore, the second intermediate processing state acquirer 261A provides a driving condition which is a first condition included in the experimental data to the simulator 250 and causes the simulator 250 to carryout simulation. Then, the second intermediate processing state acquirer 261A acquires an intermediate processing state calculated by the simulator 250. The second intermediate processing state acquirer 261A outputs an intermediate processing state to a second learner 253A and a second adjuster 259A.

In the processing system 300 in the second embodiment, because it is not necessary to collect an intermediate processing state in the experimental data, it is possible to simplify an experiment for generating first training data including an intermediate processing state.

The processing system 300 in the third embodiment achieves the following effects in addition to the effects achieved by the processing system 300 in the second embodiment.

In the processing system 300 in the third embodiment, a learning device 200 drives the simulator under a first condition, acquires an intermediate processing state at a point in time before a series of processes executed by the simulator is completed and causes a learning model to learn first training data further including the intermediate processing state. Because the intermediate processing state is generated by the simulator, it is possible to cause the simulator to calculate a state that cannot be measured by experiment.

Therefore, it is possible to improve the accuracy of inference by the learning model by including the intermediate processing state in the first training data.

Further, the learning device 200 causes the simulator to drive under a second condition different from the first condition, acquires an intermediate processing state at a point in time before a series of processes executed by the simulator is completed and a film-thickness characteristic indicating the film thickness of a solid or a liquid formed on a substrate, and causes a learning model to further learn second training data including the second condition, the intermediate processing state and the film-thickness characteristic. Thus, because the second training data can be easily generated, the learning model can be generated easily. Further, because the learning model undergoes reinforcement learning with use of the second training data including the intermediate processing state, the learning model with improved accuracy of inference easily undergoes reinforcement learning.

Fourth Embodiment

In a processing system 300 in a fourth embodiment, an information processing apparatus 100 determines a recipe using a first learning model generated by a learning device 200 before a substrate processing device 1 executes a series of processes, and corrects the recipe using a second learning model generated by the learning device 200 while the substrate processing device 1 executes the series of processes.

Figure 14:
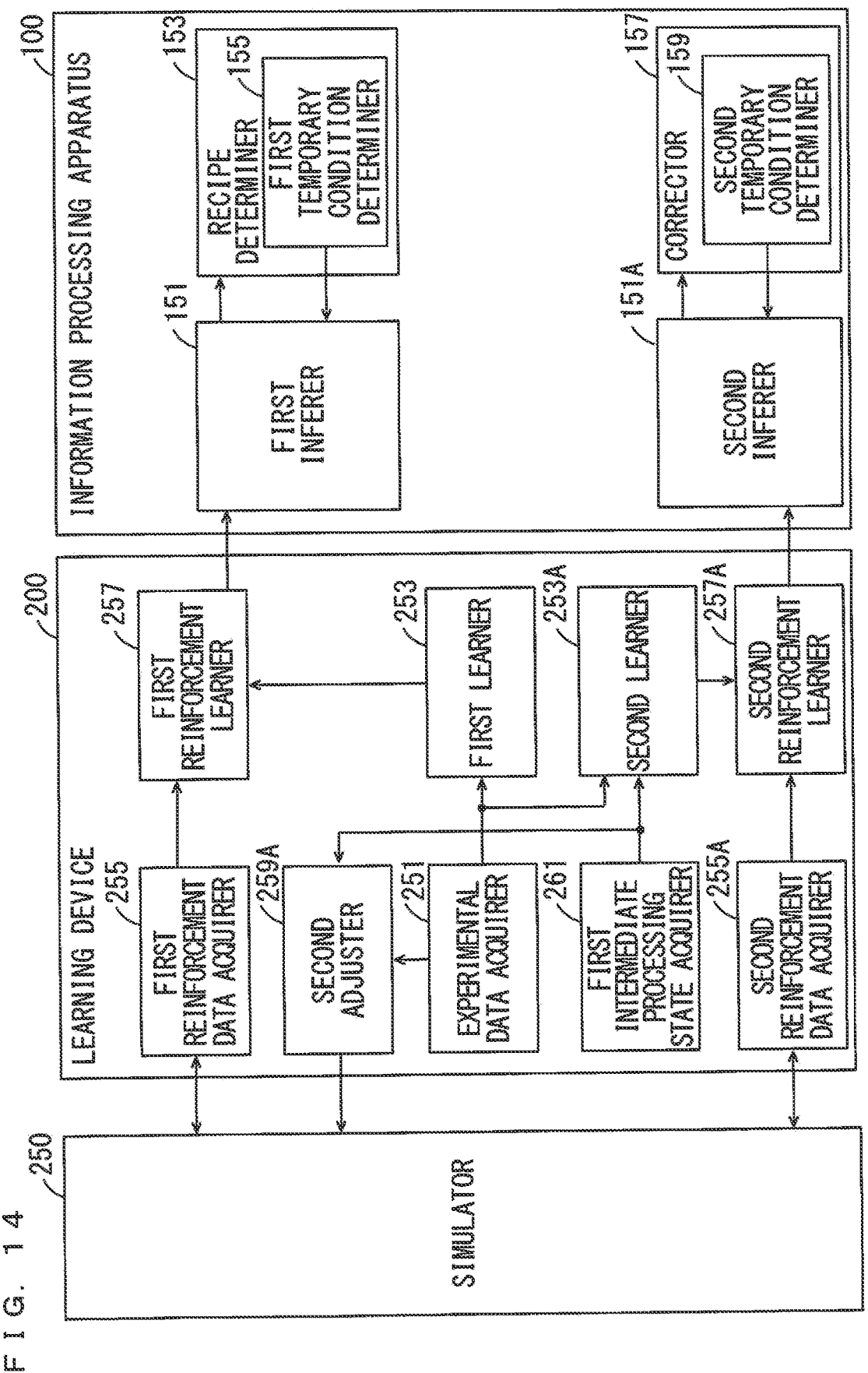
FIG. 14 is a diagram showing one example of the functional configuration of the processing system in a fourth embodiment.

FIG. 14 is a diagram showing one example of the functional configuration of the processing system in a fourth embodiment. With reference to FIG. 14, the differences from the functions shown in FIG. 3 are that, in the learning device 200, the first adjuster 259 is changed to a second adjuster 259A, a second learner 253A, a second reinforcement data acquirer 255A, a second reinforcement learner 257A and a first intermediate processing state acquirer 261 are added. Further, a second inferer 151A and a corrector 157 are added to the information processing apparatus 100. The other functions are the same as those shown in FIG. 3. A description thereof will therefore not be repeated.

The second adjuster 259A, the second learner 253A, the second reinforcement data acquirer 255A, the second reinforcement learner 257A and the first intermediate processing state acquirer 261 in the learning device 200, and the second inferer 151A and the corrector 157 in the information processing apparatus 100 are the same functions as those denoted by the same reference numerals in FIG. 9.

In the learning device 200, the experimental data acquirer 251 acquires experimental data and outputs the acquired experimental data to the first learner 253 and the second adjuster 259A.

The first learner 253 generates first training data based on the experimental data acquired by the experimental data acquirer 251 and causes a first learning model to learn the first training data. Thus, the learned first learning model is generated.

Further, the first reinforcement learner 257 causes the learned first learning model to further learn first reinforcement data acquired by the first reinforcement data acquirer 255. Thus, the first learning model further learns the first reinforcement data.

Further, the second adjuster 259A adjusts the simulator 250 based on the experimental data acquired by the experimental data acquirer 251 and an intermediate processing state acquired by the first intermediate processing state acquirer 261.

The second learner 253A generates first training data including an intermediate processing state based on the experimental data acquired by the experimental data acquirer and the intermediate processing state acquired by the first intermediate processing state acquirer 261, and causes a second learning model to learn the first training data including the intermediate processing state. The first training data including the intermediate processing state includes a first condition, the intermediate processing state and a film-thickness characteristic.

The second reinforcement learner 257A causes the learned second learning model, which the second learner 253A has caused to learn, to further learn second reinforcement data acquired by the second reinforcement data acquirer 255A. Thus, the second learning model further learns the second reinforcement data.

In the information processing apparatus 100 in the fourth embodiment, the recipe determiner 153 determines a first temporary condition including a recipe in which a random value is set, and outputs the first temporary condition to the first inferer 151. The first inferer 151 provides the first temporary condition to the first learning model and outputs the film-thickness characteristic inferred by the first learning model to the recipe determiner 153.

In a case in which the film-thickness characteristic received from the first inferer 151 indicates a value included in an allowable range, the recipe determiner 153 determines a recipe based on the first temporary condition.

Further, the corrector 157 acquires an intermediate processing state from the substrate processing device 1 that is executing a series of processes in accordance with the recipe determined by the recipe determiner 153. Further, the corrector 157 determines a second temporary condition including a recipe in which a random value is set and outputs the second temporary condition to the second inferer 151A. The second temporary condition includes the recipe, the intermediate processing state acquired from the substrate processing device 1 and a state condition. The second inferer 151A provides the second temporary condition to the second learning model and outputs the film-thickness characteristic inferred by the second learning model to the corrector 157.

In a case in which the film-thickness characteristic received from the second inferer 151A indicates a value included in the allowable range, the corrector 157 determines a new recipe based on the second temporary condition output to the second inferer 151A. The recipe set in the second temporary condition is determined as a new recipe for driving the substrate processing device 1.

The learning device 200 in the fourth embodiment executes a learning model generation process shown in each of FIGS. 5 and 10. Thus, a first learning model and a second learning model are generated.

Figure 15:
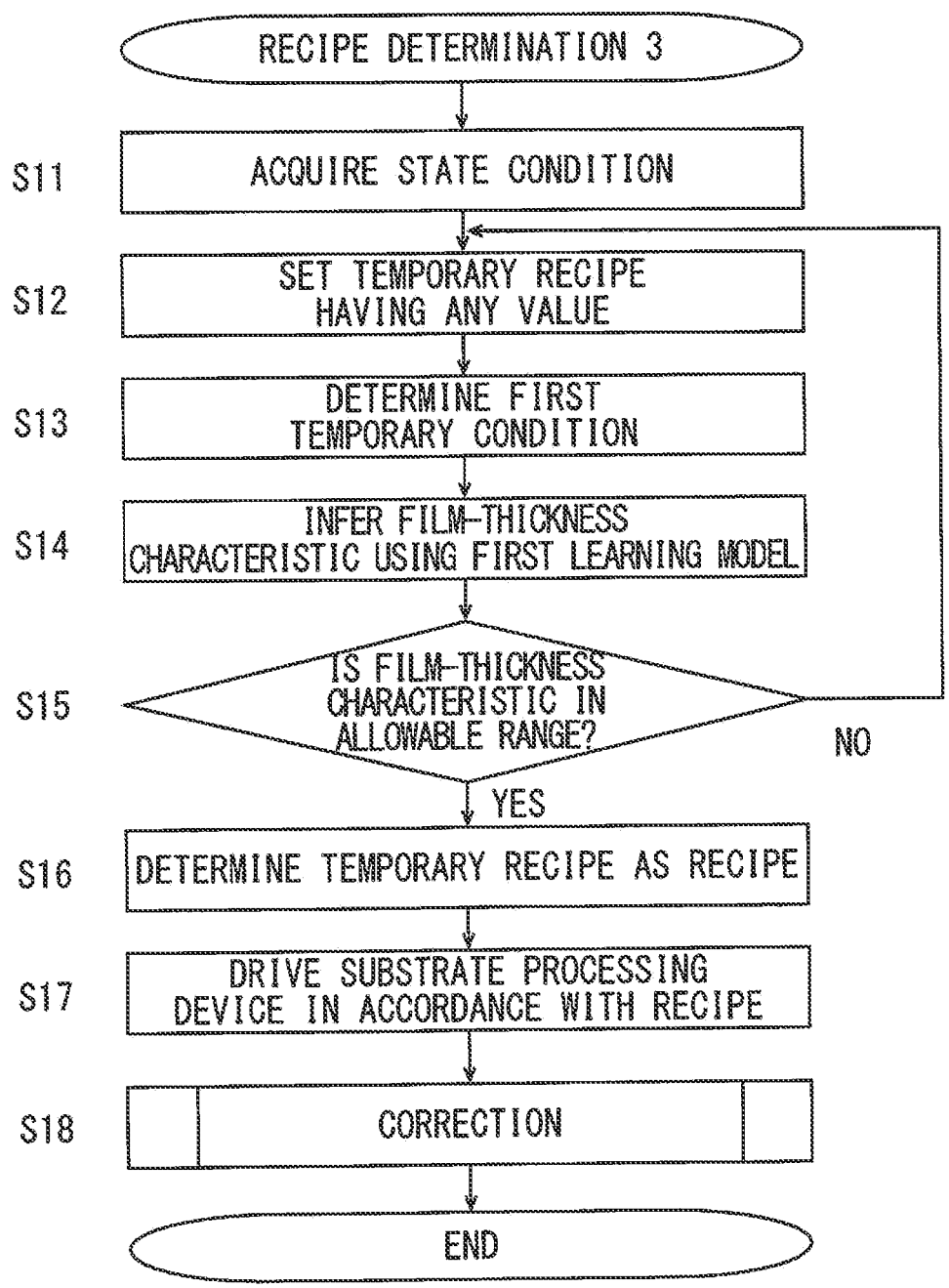
FIG. 15 is a flowchart showing one example of a flow of a recipe determination process in the fourth embodiment.

FIG. 15 is a flowchart showing one example of a flow of a recipe determination process in the fourth embodiment. With reference to FIG. 15, the difference from the process shown in FIG. 6 is that the step S18 is added. The other processes are the same as those shown in FIG. 6. A description thereof will therefore not be repeated here. In the step S18, the correction process shown in FIG. 12 is executed.

The processing system 300 in the fourth embodiment achieves the following effects in addition to the effects achieved by the processing system 300 in the third embodiment.

In the processing system 300 in the fourth embodiment, the information processing apparatus 100 determines a recipe using a first learning model, acquires an intermediate processing state at a point in time before a series of processes executed by the substrate processing device 1 in accordance with the recipe is completed, provides the intermediate processing state to the second learning model and determines a new recipe. Therefore, because different learning models are used before the substrate processing device starts the series of processes and during the series of processes, an appropriate recipe can be determined at each point in time.

[5] Other Embodiments

A learning device 200 may generate a distillation model by causing a new learning model to learn training data including a recipe determined by the information processing apparatus 100 and an inferred film-thickness characteristic.

A control device 3 included in a substrate processing device 1 may have a function included in an information processing apparatus 100. Further, a control device 3 included in a substrate processing device 1 may have the functions included in each of an information processing apparatus 100 and a learning device 200. Further, a control device 3 included in a substrate processing device 1 may have the functions included in a simulator 250, a learning device 200 and an information processing apparatus 100.

An intermediate processing state is not limited to a pressure or a temperature in the chamber 4. At least one of a thickness, a flow speed, a flow direction, a concentration and a temperature of a liquid film, and a flow speed, a flow direction, a partial pressure and a temperature of a gas flow on a substrate W may be used in addition to or separately from them. In a case in which these intermediate processing states are detected by sensors or the like, values detected by the sensors are used. In a case in which not being able to be detected by the sensors or the like, intermediate processing states are obtained by the simulator 250.

[6] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. As each of various elements recited in the claims, various other elements having configurations or functions described in the claims can be also used.

In the above-mentioned embodiment, the simulator 250 is an example of a simulator, the learning device 200 is an example of a learning device, the information processing apparatus 100 is an example of an information processing apparatus and the substrate processing device 1 is an example of a substrate processing device.

The experimental data acquirer 251 is an example of an experimental data acquirer, the first learner 253 and the second learner 253A are examples of a learner, the first intermediate processing state acquirer 261 is an example of a first intermediate data acquirer, the second intermediate processing state acquirer 261A is an example of a second intermediate data acquirer, and the first reinforcement data acquirer 255 and the second reinforcement data acquirer 255A are examples of a reinforcement data acquirer. The first reinforcement learner 257 and the second reinforcement learner 257A are examples of a reinforcement learner, and the first adjuster 259 and the second adjuster 259A are examples of an adjuster.

The recipe determiner 153 and the recipe determiner 153A are examples of a recipe determiner, the intermediate processing state generator 256 and the corrector 157 are examples of an intermediate processing state acquirer, the corrector 157 is an example of a corrector, the recipe determiner 153 is an example of a recipe determiner that determines a recipe with use of a first learning model, and the recipe determiner 153A is an example of a recipe determiner that determines a recipe with use of a second learning model.

[7] Overview of Embodiments (Item 1)

A learning device comprising a hardware processor, wherein the hardware processor acquires a film thickness of a solid or a liquid formed on a substrate by driving a substrate processing device that removes a solid film or a liquid film from a substrate to dry the substrate after supplying a liquid to the substrate and executing a series of processes of forming a solid film or a liquid film on the substrate under a first condition, and causes a learning model to learn first training data including a film-thickness characteristic, which indicates a characteristic of the film thickness of a solid or a liquid acquired by driving of the substrate processing device under a first condition.

According to this aspect, it is possible to generate a learning model for inferring a film-thickness characteristic indicating the film thickness of a solid or a liquid formed on a substrate in a process of removing a solid film or a liquid film formed on the substrate from the substrate and drying the substrate.

(Item 2)

The learning device according to item 1, wherein the hardware processor acquires an intermediate processing state at a point in time before completion of a series of processes executed by the substrate processing device driven under the first condition, and causes the learning model to learn the first training data further including the intermediate processing state acquired by driving of the substrate processing device under the first condition.

Thus, the accuracy of inference by a learning model is improved.

(Item 3)

The learning device according to item 1 or 2, wherein the hardware processor further acquires a film-thickness characteristic indicating a characteristic of a film thickness of a solid or a liquid formed on the substrate by driving a simulator that simulates a solid film or a liquid film formed by the substrate processing device under a second condition different from the first condition, and causes the learning model to further learn second training data including the second condition and the film-thickness characteristic acquired by driving of the simulator under the second condition.

Thus, because the second training data can be easily generated, the learning model can be generated easily.

(Item 4)

The learning device according to item 3, wherein the hardware processor further acquires an intermediate processing state at a point in time before completion of the series of processes executed by the simulator driven under a second condition different from the first condition, and causes the learning model to learn second training data further including the intermediate processing state acquired by driving of the simulator under the second condition.

Thus, because a learning model undergoes reinforcement learning with use of the second training data including an intermediate processing state, it is easy to generate the learning model with improved accuracy of inference.

(Item 5)

The learning device according to item 2, wherein the hardware processor adjusts a simulator simulating a solid film or a liquid film formed by the substrate processing device by using any of the first condition, the intermediate processing state acquired by driving of the substrate processing device under the first condition, and the solid film thickness or the liquid film thickness acquired by driving of the substrate processing device under the first condition.

Therefore, the accuracy of the simulator can be improved.

(Item 6)

The learning device according to item 1, wherein the hardware processor drives a simulator simulating a solid film or a liquid film formed by the substrate processing device under the first condition and acquires an intermediate processing state at a point in time before the completion of the series of processes executed by the simulator, and causes the learning model to learn the first training data further including the intermediate processing state acquired by driving of the simulator under the first condition.

According to this aspect, an intermediate processing state is generated by the simulator, a state that cannot be measured an experiment can be calculated by the simulator. Therefore, it is possible to improve the accuracy of inference by the learning model by including the intermediate processing state in the first training data.

(Item 7)

The learning device according to item 6, wherein the hardware processor drives the simulator under a second condition different from the first condition and acquires an intermediate processing state at a point in time before completion of the series of processes executed by the simulator and a film-thickness characteristic indicating a characteristic of a film thickness of a solid or a liquid formed on the substrate, and causes the learning model to further learn second training data including the second condition, and the intermediate processing state and the film-thickness characteristic that are acquired by driving of the simulator under the second condition.

Thus, because the learning model undergoes reinforcement learning with use of the second training data including the intermediate processing state, it is easy for the learning model with improved accuracy of inference to undergo reinforcement learning.

(Item 8)

The learning device according to any one of items 3 to 7, wherein the simulator is configured based on a physical model.

(Item 9)

The learning device according to any one of items 1 to 8, wherein the first training data is classified into a plurality of channels corresponding to a surface state of a substrate, a shape of a pattern formed on a substrate and physical properties of a liquid.

Thus, because a learning model is generated for each of the plurality of channels, accuracy of inference of the learning model is improved.

(Item 10)

An information processing apparatus comprising a hardware processor, wherein the hardware processor determines a recipe using the learning model generated by the learning device according to any one of items 1 to 9.

Thus, a recipe for driving the substrate processing device can be easily determined.

(Item 11)

An information processing apparatus comprising a hardware processor, wherein the hardware processor determines a recipe using a learning model that infers a film-thickness characteristic indicating a characteristic of a film thickness of a solid or a liquid formed on a substrate at a point in time at which a series of processes executed by a substrate processing device is completed based on a driving condition under which the substrate processing device is driven, the substrate processing device removing a solid film or a liquid film from the substrate to dry the substrate after supplying a liquid to the substrate and executing the series of processes of forming a solid film or a liquid film on the substrate, the driving condition has a value set for each of a plurality of items, and the hardware processor determines the recipe based on a temporary condition in a case in which a film-thickness characteristic inferred by the learning model satisfies an allowable condition when the temporary condition having a prescribed value set for part of the plurality of items and any values set for other items is provided to the learning model as the driving condition.

Therefore, in a case in which the film-thickness characteristic inferred by the learning model to which the temporary condition is provided as the driving condition satisfies the allowable condition, a recipe is determined based on the temporary condition. Therefore, it is possible to easily obtain the recipe for driving the substrate processing device using the learning model.

(Item 12)

The information processing apparatus according to item 11, wherein the driving condition further includes an intermediate processing state at a point in time before completion of the series of processes executed by the substrate processing device, and the hardware processor acquires an intermediate processing state at a point in time before the completion of the series of processes executed by the substrate processing device driven in accordance with the recipe, and provides the intermediate processing state acquired by driving of the substrate processing device in accordance with the recipe and a temporary condition having a prescribed value set for part of the plurality of items and any values set for other items as the driving condition to the learning model, and determines a new recipe based on the temporary condition in a case in which a film-thickness characteristic inferred by the learning model satisfies an allowable condition.

According to this aspect, a new recipe is determined based on an intermediate processing state at a point in time before the series of processes executed in accordance with a recipe by the substrate processing device is completed. Therefore, in a case in which the driving condition changes while the substrate processing device 1 executes the series of processes, it is possible to cause the film-thickness characteristic of a solid film or a liquid film formed by the substrate processing device 1 to fall in an allowable range.

(Item 13)

An information processing apparatus comprising a hardware processor, wherein the hardware processor acquires an intermediate processing state at a point in time before completion of a series of processes executed by a substrate processing device that removes a solid film or a liquid film from a substrate to dry the substrate after supplying a liquid to the substrate and executes the series of processes of forming a solid film or a liquid film on the substrate, and determines a recipe using a learning model that infers a film-thickness characteristic indicating a characteristic of a film thickness of a solid or a liquid formed on the substrate at a point in time at which the series of processes executed by the substrate processing device is completed based on a driving condition under which the substrate processing device is driven and an intermediate processing state at a point in time before the completion of the series of processes executed by the substrate processing device driven under the driving condition, the driving condition has a value set for each of a plurality of items, and the hardware processor provides the acquired intermediate processing state and a temporary condition having a prescribed value set for part of the plurality of items and any values set for other items as the driving condition to the learning model, and determines a new recipe based on the temporary condition in a case in which a film-thickness characteristic inferred by the learning model satisfies an allowable condition.

According to this aspect, a new recipe is determined based on an intermediate processing state at a point in time before the series of processes executed by the substrate processing device is completed. Therefore, in a case in which the driving condition changes while the substrate processing device 1 executes the series of processes, it is possible to cause the film-thickness characteristic of a solid film or a liquid film formed by the substrate processing device 1 to fall in an allowable range.

(Item 14)

An information processing apparatus comprising a hardware processor, wherein the hardware processor determines a recipe using a first learning model that infers a film-thickness characteristic indicating a characteristic of a film thickness of a solid or a liquid formed on a substrate at a point in time at which a series of processes executed by a substrate processing device is completed based on a driving condition under which the substrate processing device is driven, the substrate processing device removing a solid film or a liquid film from the substrate to dry the substrate after supplying a liquid to the substrate and executing the series of processes of forming a solid film or a liquid film on the substrate, acquires an intermediate processing state at a point in time before completion of the series of processes executed in accordance with the recipe by the substrate processing device, and supplies the acquired intermediate processing state to a second learning model, which infers a film-thickness characteristic indicating a characteristic of a film thickness of a solid or a liquid formed on the substrate at a point in time at which the series of processes executed by the substrate processing device is completed based on the driving condition and an intermediate processing state at a point in time before completion of the series of processes executed by the substrate processing device in accordance with the recipe, and determines a new recipe.

According to this aspect, a recipe before the substrate processing device starts the series of processes is determined with use of a first learning mode, and a new recipe before the substrate processing device completes the series of processes is determined with use of a second learning model. Therefore, because different learning models are used before the substrate processing device starts the series of processes and during the series of processes, an appropriate recipe can be determined at each point in time.

(Item 15)

The learning device according to any one of items 10 to 14, wherein the hardware processor causes a new learning model to learn training data including a recipe determined by the information processing apparatus according to any one of items 10 to 14 and an inferred film-thickness characteristic.

(Item 16)

A substrate processing device comprising the information processing apparatus according to any one of items 10 to 14.

(Item 17)

The substrate processing system according to item 16, further comprising the learning device according to any one of items 1 to 9 and 15.

(Item 18)

A substrate processing system comprising the information processing apparatus according to any one of items 10 to 14 and the substrate processing device.

(Item 19)

A learning method including an experimental data acquiring step of acquiring a film thickness of a solid or a liquid formed on the substrate by driving a substrate processing device that removes a solid film or a liquid film from a substrate to dry the substrate after supplying a liquid to the substrate and executing a series of processes of forming a solid film or a liquid film on the substrate under a first condition, and a learning step of causing a learning model to learn first training data including the film-thickness characteristic indicating a characteristic of a film thickness acquired in the experimental data acquiring step and the first condition.

(Item 20)

The learning method according to item 19, further including a first intermediate data acquiring step of acquiring an intermediate processing state at a point in time before completion of a series of processes executed by the substrate processing device driven under the first condition, wherein the learning step includes causing the learning model to learn the first training data further including the intermediate processing state acquired in the first intermediate data acquiring step.

(Item 21)

The learning method according to item 19 or 20, further including a reinforcement data acquiring step of acquiring a film-thickness characteristic indicating a characteristic of a film thickness of a solid or a liquid formed on the substrate by driving a simulator that simulates a solid film or a liquid film formed by the substrate processing device under a second condition different from the first condition, and a reinforcement learning step of causing the learning model to further learn second training data including the second condition and the film-thickness characteristic acquired in the reinforcement data acquiring step.

(Item 22)

The learning method according to item 21, wherein the reinforcement data acquiring step includes further acquiring an intermediate processing state at a point in time before completion of the series of processes executed by the simulator driven under a second condition different from the first condition, and the reinforcement learning step includes causing the learning model to learn second learning model further including an intermediate processing state acquired in the reinforcement data acquiring step.

(Item 23)

The learning method according to any one of items 19 to 22, further including a second intermediate data acquiring step of driving a simulator that simulates a solid film or a liquid film formed by the substrate processing device under the first condition and acquiring an intermediate processing state at a point in time before completion of the series of processes executed by the simulator, wherein the learning step includes causing the learning model to learn the first training data further including the intermediate processing state acquired in the second intermediate data acquiring step.

(Item 24)

A recipe determination method including a recipe determination step of determining a recipe using a learning model that infers a film-thickness characteristic indicating a characteristic of a film thickness of a solid or a liquid formed on a substrate at a point in time at which a series of processes executed by the substrate processing device is completed based on a driving condition under which the substrate processing device is driven, the substrate processing device removing a solid film or a liquid film from the substrate to dry the substrate after supplying a liquid to the substrate and executing the series of processes of forming a solid film or a liquid film on the substrate, wherein the driving condition has a value set for each of a plurality of items, and the recipe determination step includes determining the recipe based on a temporary condition in a case in which a film-thickness characteristic inferred by the learning model satisfies an allowable condition when the temporary condition having a prescribed value set for part of the plurality of items and any values set for other items is provided to the learning model as the driving condition.

(Item 25)

The recipe determination method according to item 24, wherein the driving condition further includes an intermediate processing state at a point in time before completion of the series of processes executed by the substrate processing device, and the recipe determination method further includes an intermediate processing state acquiring step of acquiring an intermediate processing state at a point in time before the completion of the series of processes executed by the substrate processing device in accordance with the recipe, and a correction step of providing the intermediate processing state acquired in the intermediate processing state acquiring step and a temporary condition having a prescribed value set for part of the plurality of items and any values set for other items as the driving condition to the learning model and determining a new recipe based on the temporary condition in a case in which a film-thickness characteristic inferred by the learning model satisfies an allowable condition.

(Item 26)

A recipe determination method including an intermediate processing state acquiring step of acquiring an intermediate processing state at a point in time before completion of a series of processes executed by an substrate processing device that removes a solid film or a liquid film from a substrate to dry the substrate after supplying a liquid to the substrate and executes the series of processes of forming a solid film or a liquid film on the substrate; and a correction step of determining a recipe using a learning model that infers a film-thickness characteristic indicating a characteristic of a film thickness of a solid or a liquid formed on the substrate at a point in time at which the series of processes executed by the substrate processing device is completed based on a driving condition under which the substrate processing device is driven and an intermediate processing state at a point in time before the completion of the series of processes executed by the substrate processing device driven under the driving condition, wherein the driving condition has a value set for each of a plurality of items, and a correction step includes providing the intermediate processing state acquired in the intermediate processing state acquiring step and a temporary condition having a prescribed value set for part of the plurality of items and any values set for other items as the driving condition to the learning model, and determining a new recipe based on the temporary condition in a case in which a film-thickness characteristic inferred by the learning model satisfies an allowable condition.

(Item 27)

A non-transitory computer readable medium storing a learning program, the learning program causing a computer to acquire a film thickness of a solid or a liquid formed on the substrate by driving a substrate processing device that removes a solid film or a liquid film from a substrate to dry the substrate after supplying a liquid to the substrate and executing a series of processes of forming a solid film or a liquid film on the substrate under a first condition, and cause a learning model to learn first training data including the film-thickness characteristic acquired by driving of the substrate processing device under the first condition.

<Effects of Embodiment>

It is possible to generate a learning model for inferring a film-thickness characteristic indicating the film thickness of a solid or a liquid formed on a substrate in a process of removing a solid film or a liquid film formed on the substrate from the substrate and drying the substrate.

Further, generation of a learning model is facilitated.

Further, it is possible to easily obtain a recipe for driving the substrate processing device using the learning model.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A learning device comprising a hardware processor, wherein
the hardware processor
acquires a film thickness of a solid or a liquid formed on a substrate by driving a substrate processing device that removes a solid film or a liquid film from the substrate to dry the substrate after supplying a liquid to the substrate and executing a series of processes of forming the solid film or the liquid film on the substrate under a first condition, and
causes a learning model to learn first training data including a first film-thickness characteristic, which indicates a characteristic of the film thickness of the solid or the liquid acquired by driving of the substrate processing device under the first condition.

2. The learning device according to claim 1, wherein
the hardware processor
acquires an intermediate processing state at a point in time before completion of the series of processes executed by the substrate processing device driven under the first condition, and
causes the learning model to learn the first training data further including the intermediate processing state acquired by driving of the substrate processing device under the first condition.

3. The learning device according to claim 1, wherein
the hardware processor further
acquires a second film-thickness characteristic indicating a characteristic of a film thickness of a solid or a liquid formed on the substrate by driving a simulator that simulates a solid film or a liquid film formed by the substrate processing device under a second condition different from the first condition, and
causes the learning model to further learn second training data including the second condition and the second film-thickness characteristic acquired by driving of the simulator under the second condition.

4. The learning device according to claim 3, wherein the hardware processor further
acquires an intermediate processing state at a point in time before the series of processes executed by the simulator driven under the second condition different from the first condition, and
causes the learning model to learn second training data further including the intermediate processing state acquired by driving of the simulator under the second condition.

5. The learning device according to claim 2, wherein the hardware processor adjusts a simulator simulating the solid film or the liquid film formed by the substrate processing device by using any of the first condition, the intermediate processing state acquired by driving of the substrate processing device under the first condition, and the solid film thickness or the liquid film thickness acquired by driving of the substrate processing device under the first condition.

6. The learning device according to claim 1, wherein the hardware processor
drives a simulator simulating the solid film or the liquid film formed by the substrate processing device under the first condition and acquires an intermediate processing state at a point in time before the completion of the series of processes executed by the simulator, and
causes the learning model to learn the first training data further including the intermediate processing state acquired by driving of the simulator under the first condition.

7. The learning device according to claim 6, wherein the hardware processor
drives the simulator under a second condition different from the first condition and acquires an intermediate processing state at a point in time before completion of the series of processes executed by the simulator and a second film-thickness characteristic indicating the characteristic of the film thickness of the solid or a liquid formed on the substrate, and
causes the learning model to further learn second training data including the second condition, and the intermediate processing state and the second film-thickness characteristic that are acquired by driving of the simulator under the second condition.

8. The learning device according to claim 3, wherein the simulator is configured based on a physical model.

9. The learning device according to claim 1, wherein the first training data is classified into a plurality of channels corresponding to a surface state of the substrate, a shape of a pattern formed on the substrate and physical properties of the liquid.

10. An information processing apparatus comprising a hardware processor, wherein the hardware processor determines a recipe using the learning model generated by the learning device according to claim 1.

11. The learning device according to claim 1, wherein the hardware processor causes a new learning model to learn training data including a recipe determined by the information processing apparatus according to claim 10 and an inferred film-thickness characteristic.

12. A substrate processing device comprising the information processing apparatus according to claim 10.

13. The substrate processing system according to claim 12, further comprising the learning device according to claim 1.

14. A substrate processing system comprising the information processing apparatus according to claim 10 and the substrate processing device.

15. A non-transitory computer readable medium storing a learning program,
the learning program causing a computer to
acquire a film thickness of a solid or a liquid formed on a substrate by driving a substrate processing device that removes a solid film or a liquid film from the substrate to dry the substrate after supplying a liquid to the substrate and executing a series of processes of forming the solid film or the liquid film on the substrate under a first condition, and
cause a learning model to learn first training data including a film-thickness characteristic acquired by driving of the substrate processing device under the first condition.

* * * * *